(12) United States Patent
Kojima

(10) Patent No.: US 7,168,811 B2
(45) Date of Patent: Jan. 30, 2007

(54) DISPLAY DEVICE AND PROJECTOR

(75) Inventor: Hideki Kojima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/762,352

(22) Filed: Jan. 23, 2004

(65) Prior Publication Data

US 2004/0201827 A1    Oct. 14, 2004

(30) Foreign Application Priority Data

Apr. 11, 2003  (JP) .............................. 2003-107289
Nov. 5, 2003   (JP) .............................. 2003-375706

(51) Int. Cl.
 G03B 21/28   (2006.01)
 G02F 1/1335  (2006.01)

(52) U.S. Cl. .............................. 353/81; 353/33; 349/57

(58) Field of Classification Search ............ 353/30–32, 353/85–89, 97, 102, 33, 81; 349/7–9, 57, 349/61, 62; 348/742, 743, 792, 800
See application file for complete search history.

(56) References Cited

U.S. PATENT DOCUMENTS

| 5,517,340 | A  | * | 5/1996  | Doany et al. ................... 349/5 |
| 5,863,125 | A  | * | 1/1999  | Doany .......................... 353/84 |
| 6,511,183 | B2 |   | 1/2003  | Shimizu et al. ................ 353/20 |
| 6,540,362 | B1 |   | 4/2003  | Janssen |
| 6,568,815 | B2 | * | 5/2003  | Yano ........................... 353/84 |
| 6,771,325 | B1 | * | 8/2004  | Dewald et al. ............. 348/743 |
| 6,827,450 | B1 | * | 12/2004 | McGettigan et al. ......... 353/31 |
| 7,008,064 | B2 | * | 3/2006  | McDonald .................... 353/84 |
| 2001/0038483 | A1 | * | 11/2001 | Lambert ..................... 359/196 |
| 2002/0012103 | A1 | * | 1/2002  | Cho et al. ..................... 353/31 |
| 2002/0191154 | A1 |   | 12/2002 | Shahzad et al. |
| 2003/0030913 | A1 |   | 2/2003  | Park et al. ................... 359/634 |
| 2004/0057018 | A1 | * | 3/2004  | Cho et al. ..................... 353/31 |

(Continued)

FOREIGN PATENT DOCUMENTS

EP    1 398 973 A1    3/2004

(Continued)

OTHER PUBLICATIONS

Janssen, "A novel single light valve high brightness HD color projector", *IDRC '93*, pp. 249-252.

(Continued)

*Primary Examiner*—W. B. Perkey
*Assistant Examiner*—Andrew Sever
(74) *Attorney, Agent, or Firm*—Oliff & Berridge, PLC

(57) ABSTRACT

To provide a display device and a projector capable of enhancing the quality of dynamic images, of reducing limitations on light sources, enhancing the utilization efficiency of light, and of displaying images in full color, illumination light emitted from a light source lamp is irradiated onto some pixels of a liquid crystal light valve capable of displaying images in colors. A rotating prism scans the illumination light. At this time, fly eye lenses and an superposing lens condense illumination light emitted from the light source lamp to form an image. The image formed by the fly eye lenses and the superposing lens is formed again on the liquid crystal light valve by the image reforming lenses. The image of the liquid crystal light valve is enlarged and projected by the projection lens to a screen.

8 Claims, 13 Drawing Sheets

U.S. PATENT DOCUMENTS

2004/0080718 A1* 4/2004 Kojima .................. 353/55
2004/0246446 A1* 12/2004 Lee et al. ................ 353/31

FOREIGN PATENT DOCUMENTS

| EP | 1 489 457 A1 | 12/2004 | |
|----|---|---|---|
| JP | A-08-022006 | 1/1996 | |
| JP | A-8-304739 | 11/1996 | |
| JP | A-2000-275604 | 10/2000 | |
| JP | A-2001-296841 | 10/2001 | |
| JP | A-2002-69766 | 1/2002 | |
| JP | 2004-004463 | 1/2004 | |
| KR | A-2003-0013931 | 2/2003 | 259/634 |
| WO | WO 03/083573 A1 | 10/2003 | |

OTHER PUBLICATIONS

Shimizu, "Single panel reflective LCD projector", *SPIE*, vol. 3634, Jan. 1999, pp. 197-206.

Shimizu, "Single Panel Reflective LCD Optics", *IDW '99*, pp. 989-992.

Shimizu, "Scrolling Color LCOS for HDTV Rear Projection", *SID 01 Digest*, pp. 1072-1075.

Brennesholtz, "Color-Sequential LCoS Projector with a Rotating Drum", *SID 02 Digest*, pp. 1346-1349.

Arai et al., "A New Projection System with Scrolling Illumination for Motion Picture", *SID 03 Digest*, pp. 770-773.

\* cited by examiner

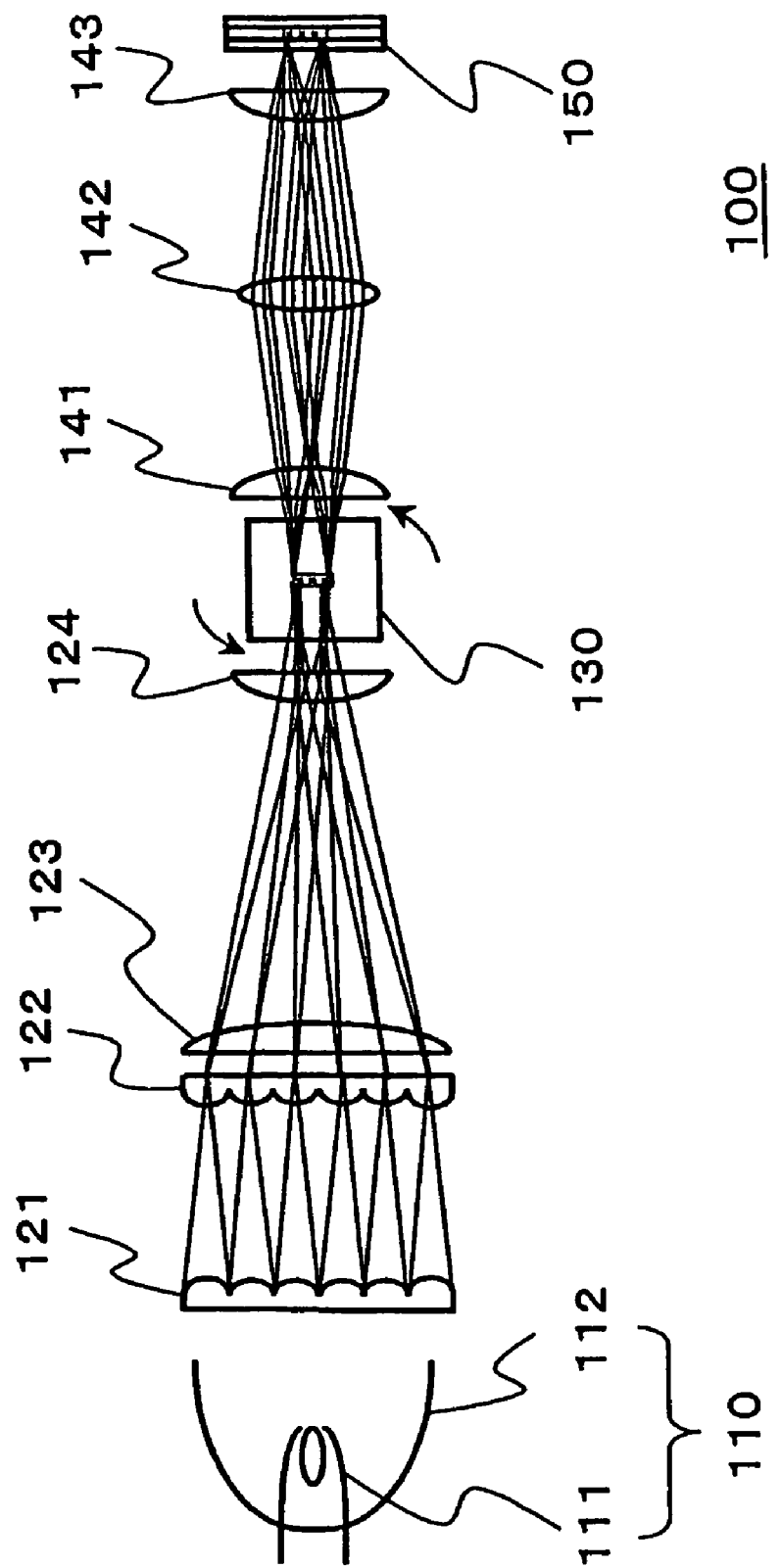
[Fig. 1]

[Fig. 2]
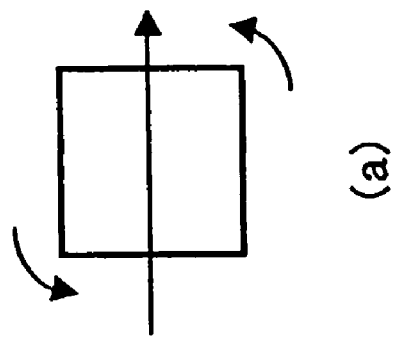
(d)
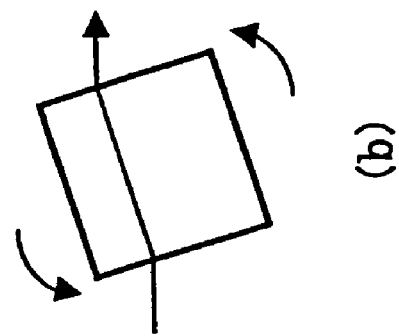
(c)
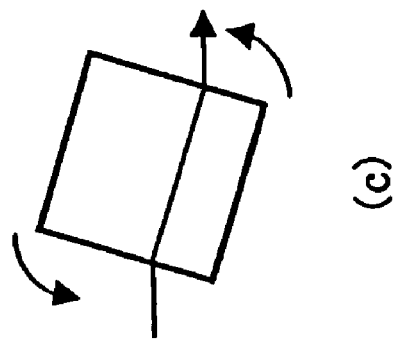
(b)
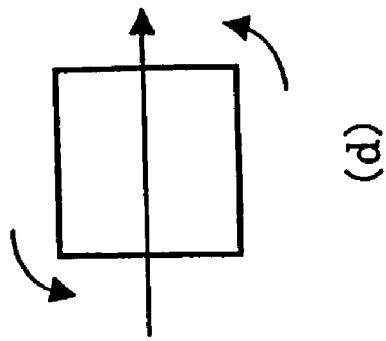
(a)

[Fig. 3]
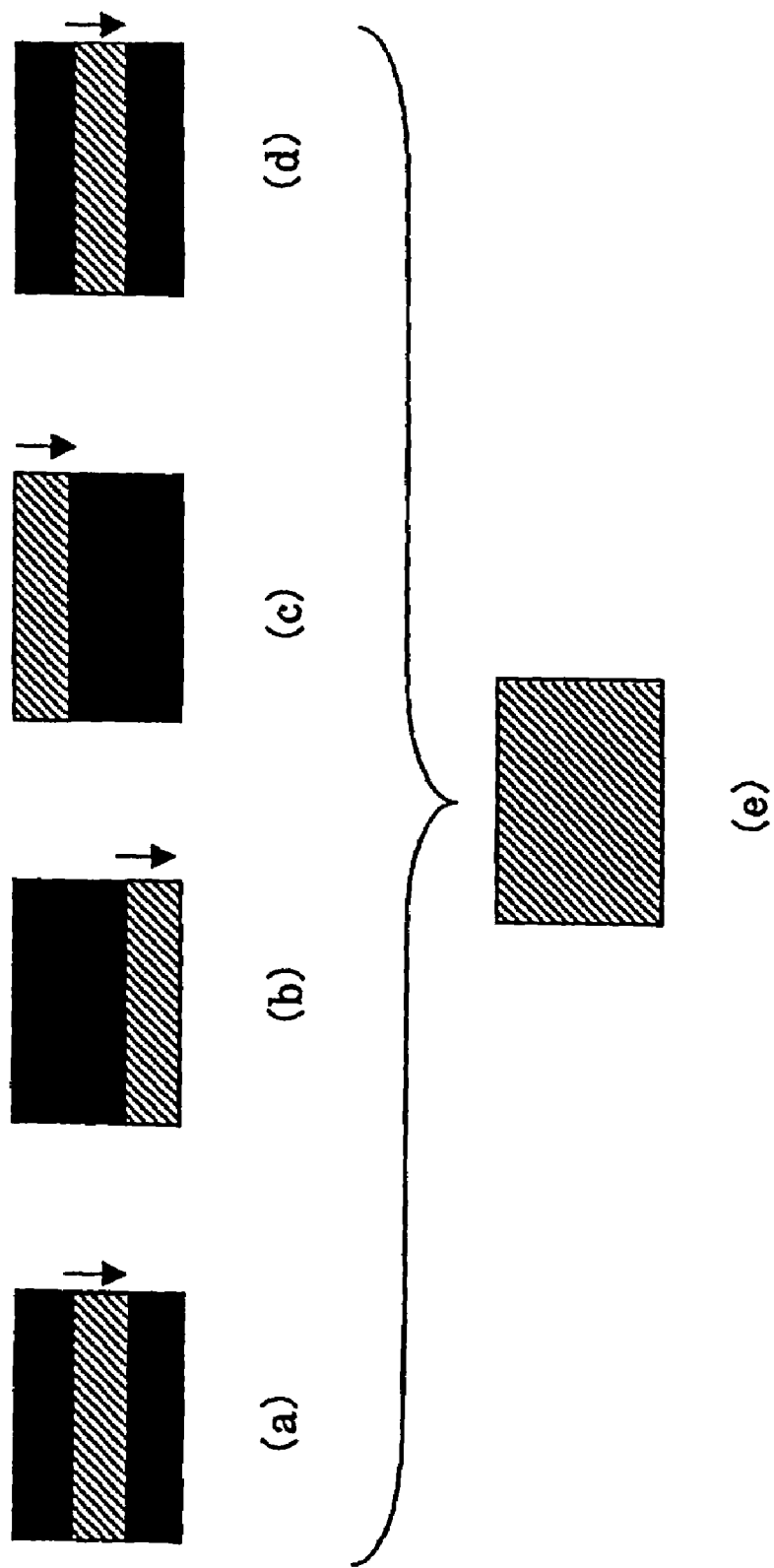

[Fig. 4]
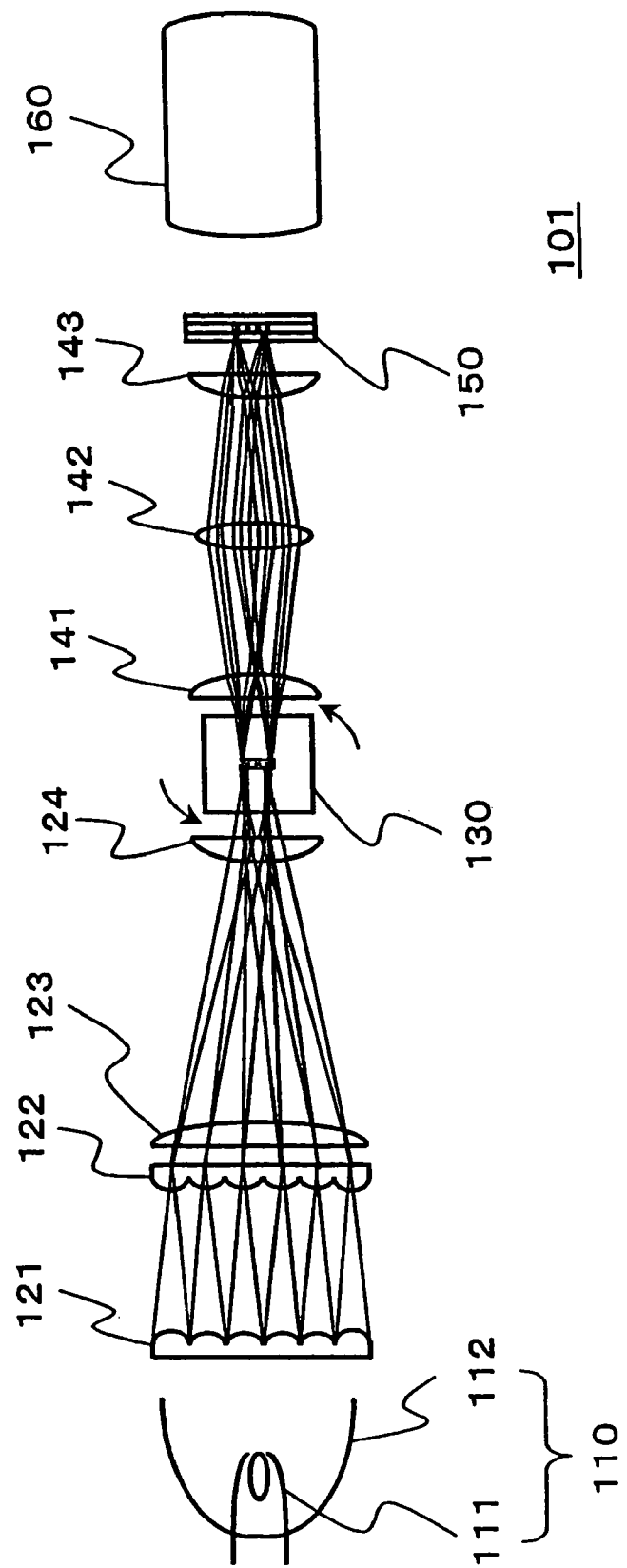

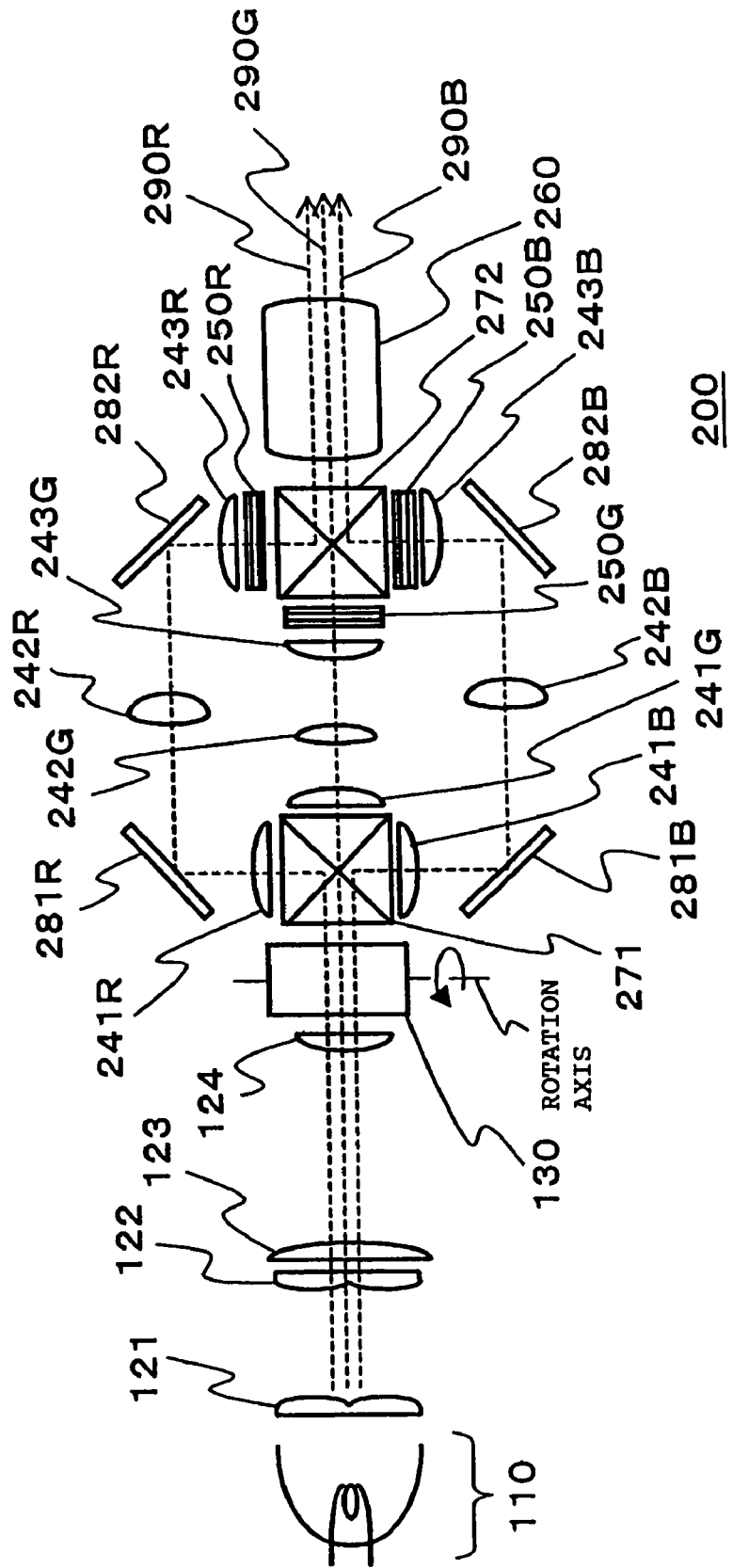
[Fig. 5]

[Fig. 6]
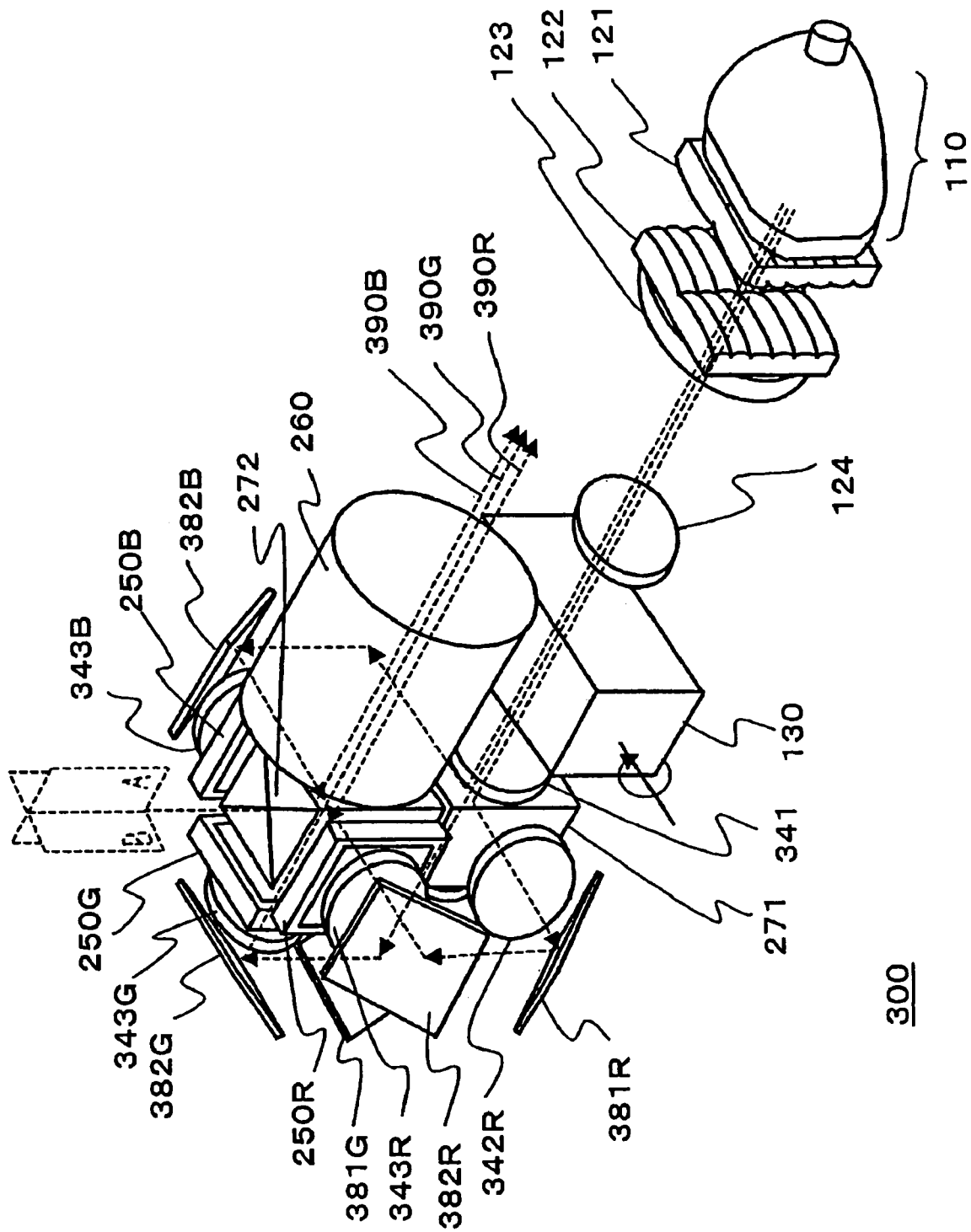

[Fig. 7]
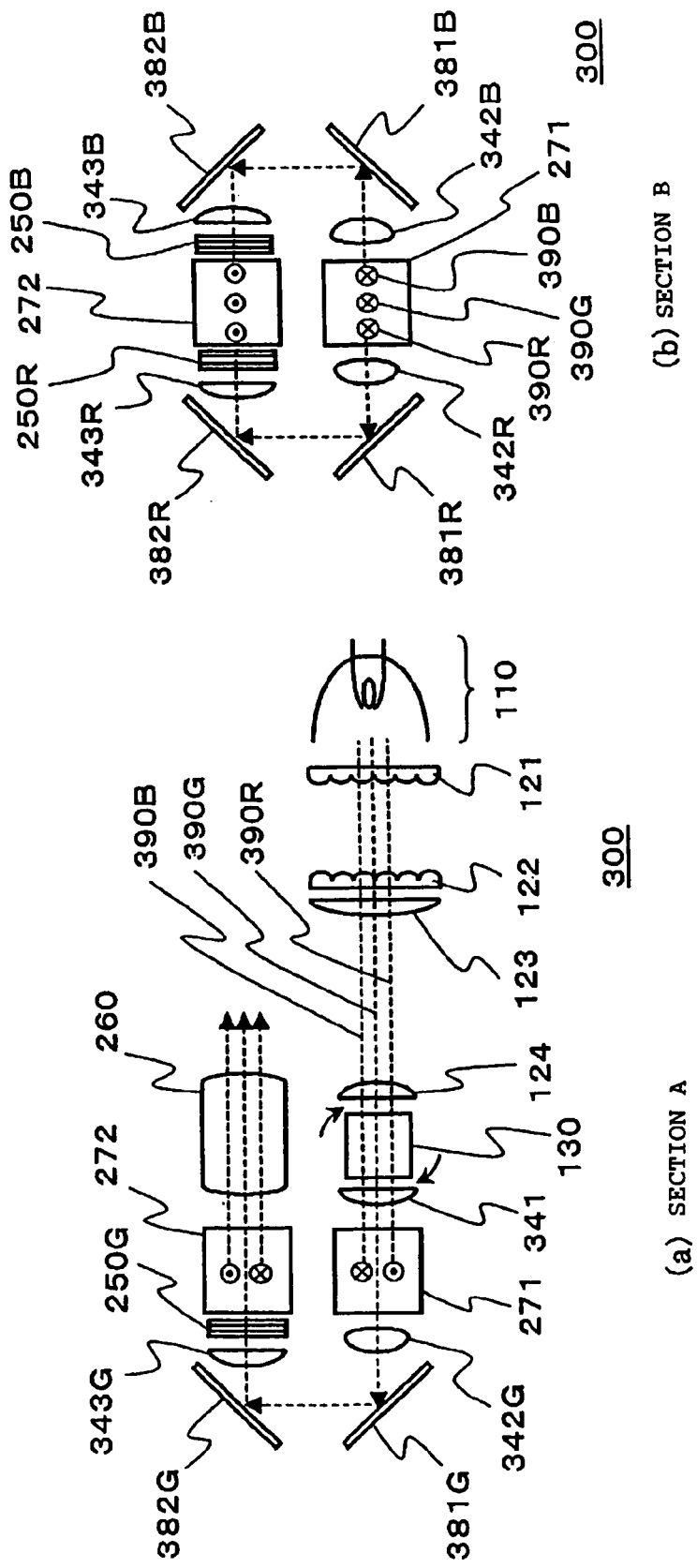

[Fig. 8]
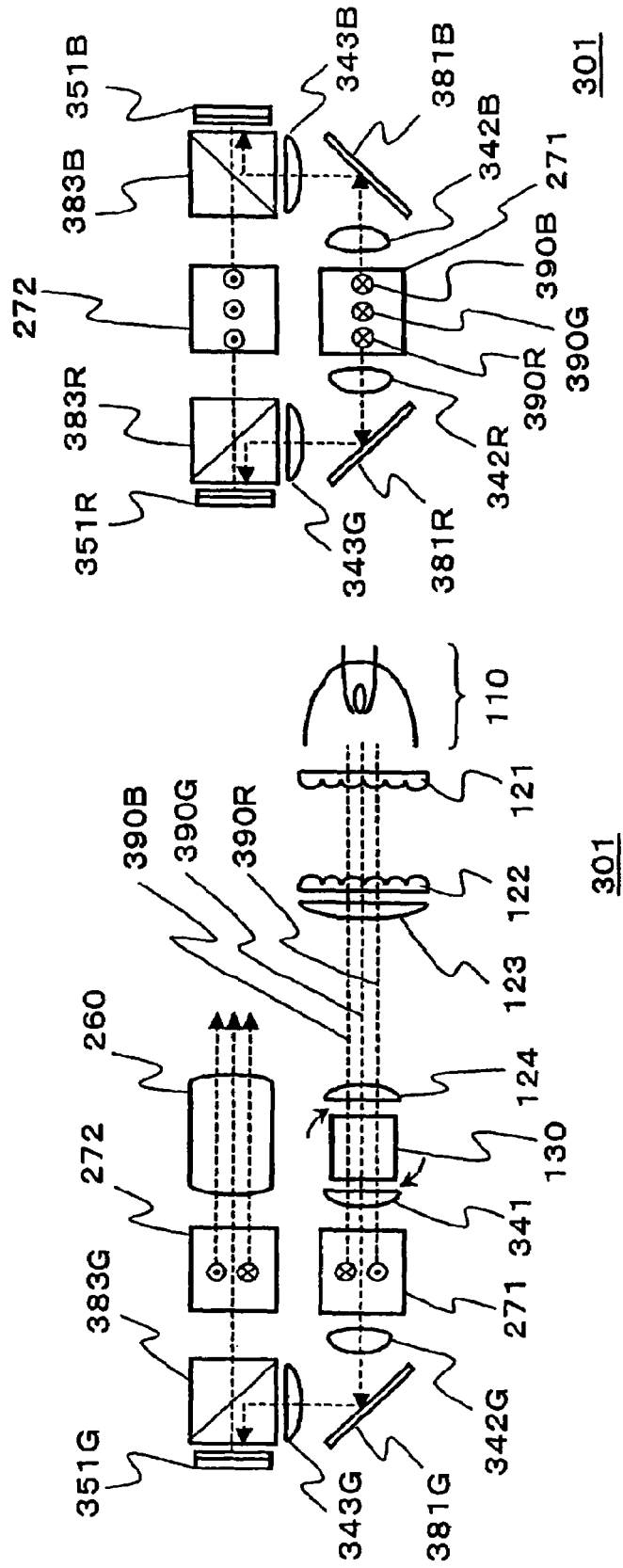

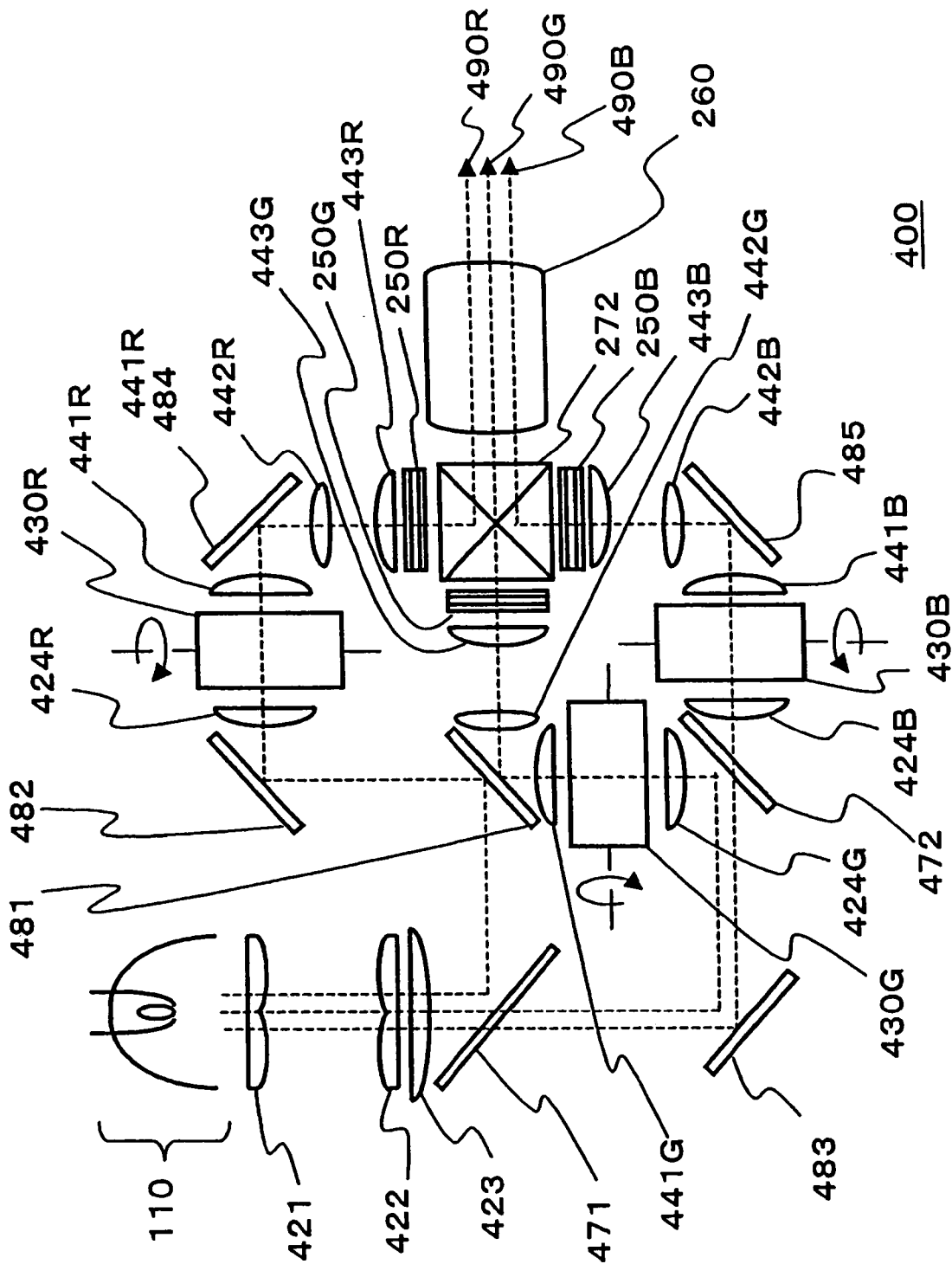
[Fig. 9]

[Fig. 10]
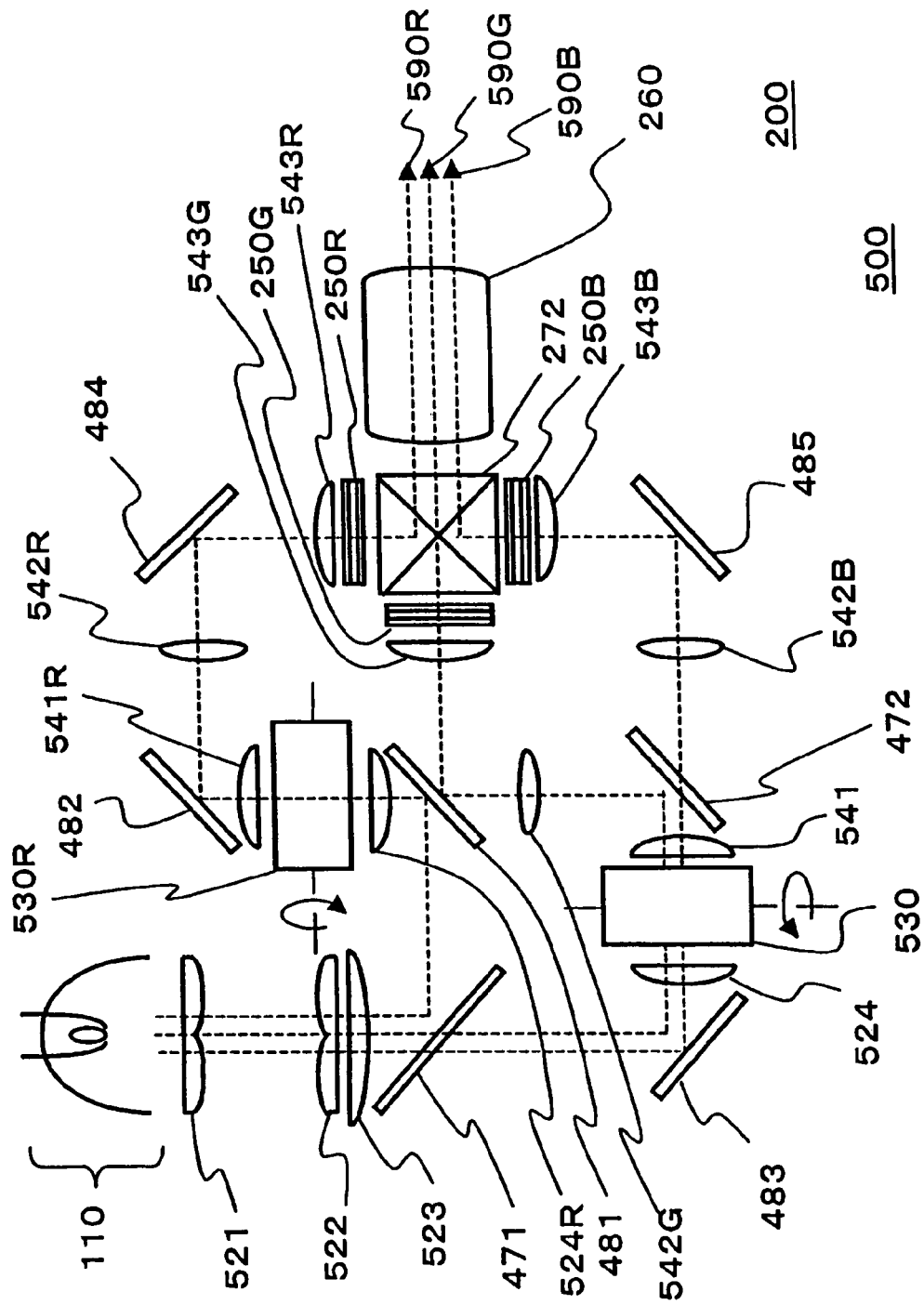

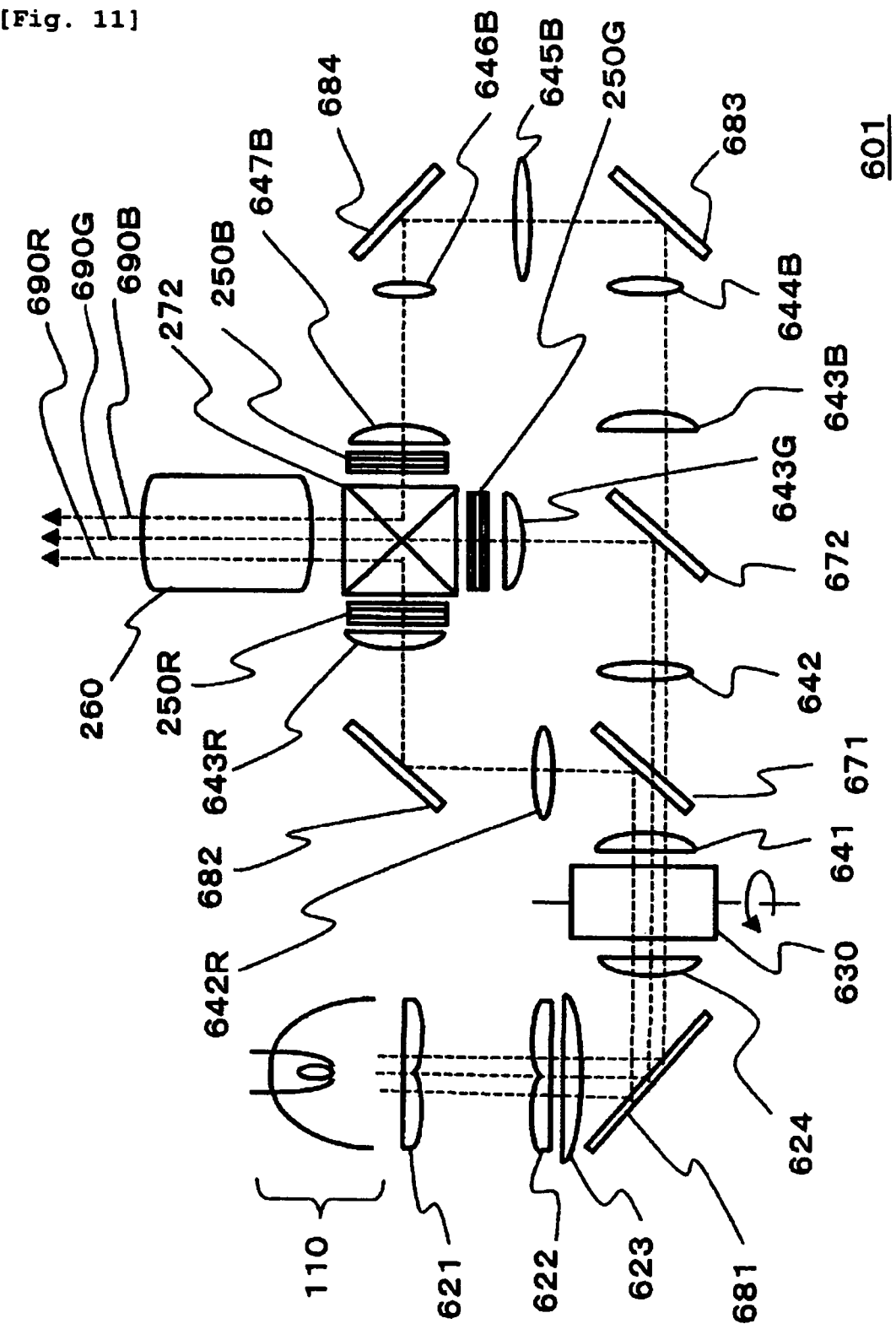
[Fig. 11]

[Fig. 12]
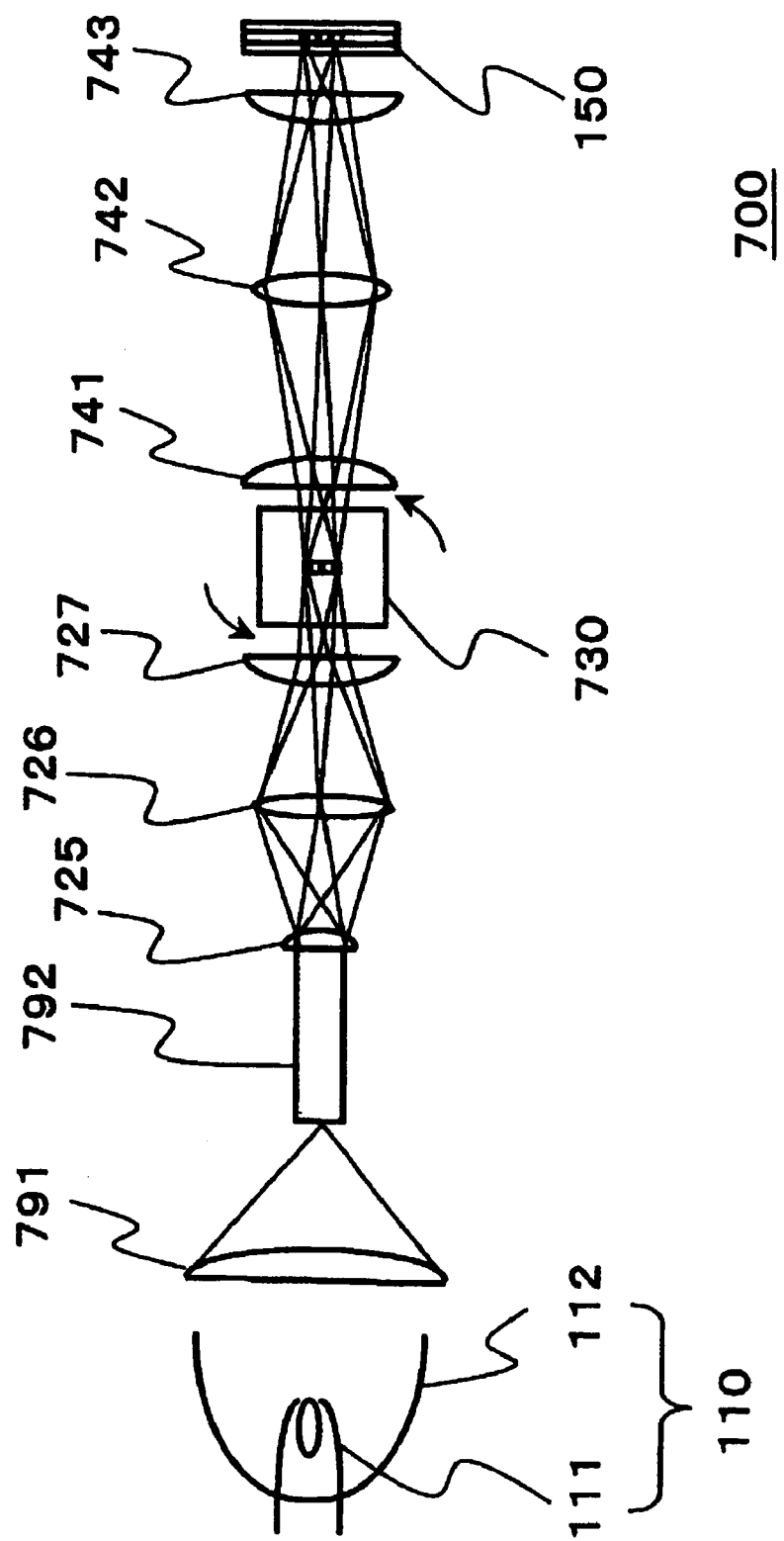

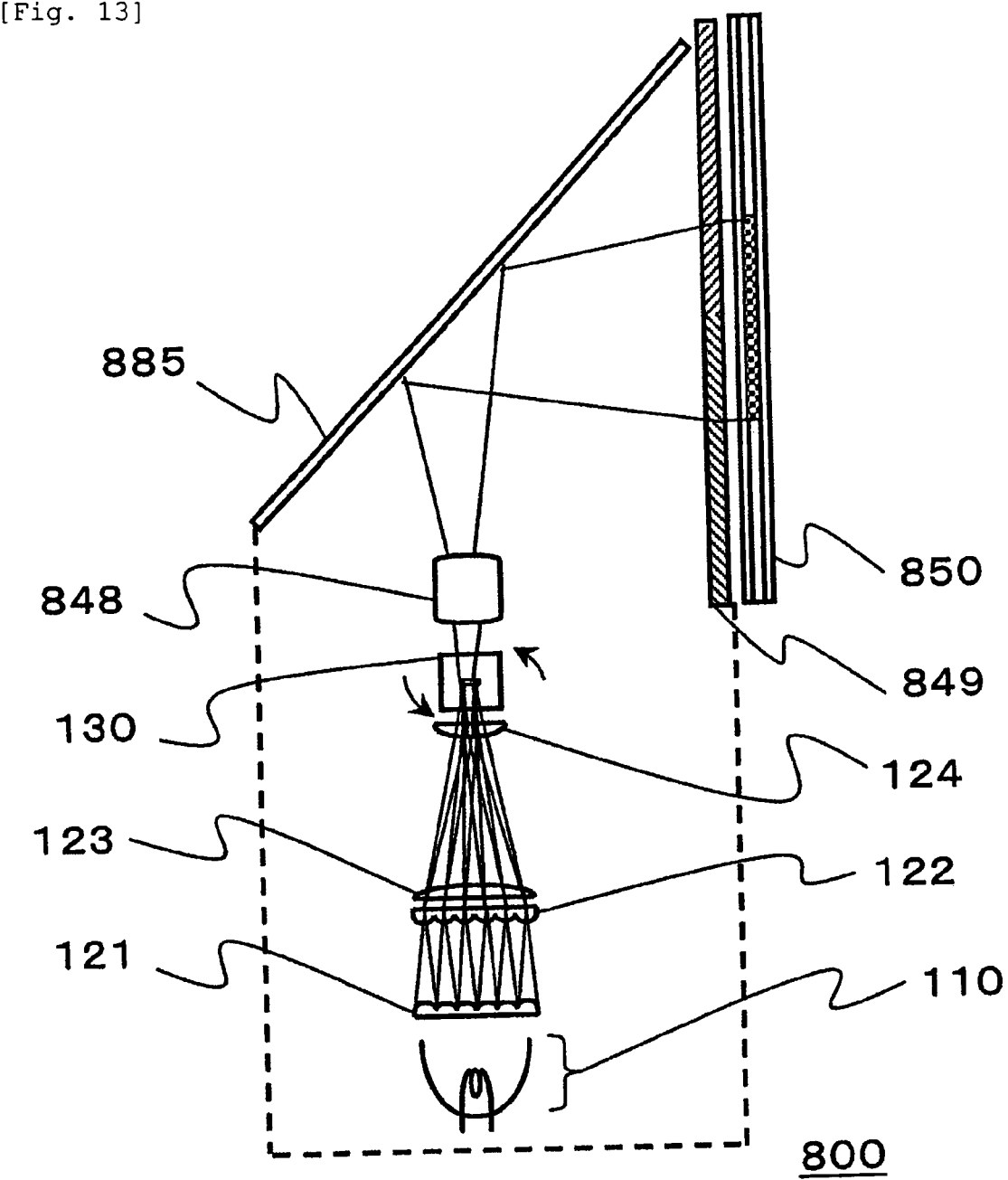
[Fig. 13]

DISPLAY DEVICE AND PROJECTOR

BACKGROUND OF THE INVENTION

1. Field of Invention

The present invention relates to a display device to irradiate illumination light emitted from a light source onto display elements, thereby displaying images, and to a projector to make illumination light that is modulated by a plurality of pixels incident on a projection lens of the display element and projecting images from the projection lens to a screen, thereby displaying the images.

2. Description of Related Art

In related art display devices, a technique is known wherein the image quality of dynamic images is enhanced by scanning a region onto which the illumination light is irradiated to a display device.

In a related art display element, a structure is known wherein a region onto which illumination light is irradiated to a display element is scanned by intermittently turning on and off a plurality of light sources arranged on the rear face of the display element. See Japanese Unexamined Patent Application Publication No. 2000-275604.

In another related art display device, a structure is known wherein an illuminated region is scanned to a display element by rotating a condensing barrel that has a slit for determining the direction in which light sources emit light. See Japanese Unexamined Patent Application Publication No. 2002-6766.

SUMMARY OF THE INVENTION

According to the structure of Japanese Unexamined Patent Application Publication No. 2000-275604, it is necessary to arrange a plurality of light sources in a plane and to intermittently turn the light sources on and off for uniform illumination. In particular, a light source for a projector requires high brightness. Therefore, a discharge lamp is generally used. However, it is difficult to apply the above technique to a display device that requires such a light source. Since light sources are turned off at times, images are displayed darker than they otherwise would be with consideration to the number of light sources.

According to the structure of Japanese Unexamined Patent Application Publication No. 2002-6766, it is not necessary to instantaneously turn light sources on and off and to arrange several light sources in a plane for uniform illumination. However, since light diffused and emitted from the light sources to various directions is limited to one direction by rotating a condensing barrel in which a slit is formed, it is difficult to correctly guide the light that does not directly pass through the slit to a display element and thereby to irradiate the light. Since a region to be illuminated is scanned by scanning a member for shielding light, it is difficult to enhance the utilization efficiency of light by the amount of light that reaches the member for shielding light. Furthermore, in the structure of Japanese Unexamined Patent Application Publication No. 2002-6766, the angle of illumination light incident on the display element varies according to the illuminated position in the display element. Therefore, it is not possible to scan the illumination light to the display element while maintaining a uniform incidence angle of illumination light. Since it is not possible to illuminate the entire region to be illuminated in the same state, it is difficult to display images with uniform image quality.

Accordingly, the present invention provides a display device and a projector capable of enhancing the image quality of dynamic images, reducing limitations on light sources, enhancing the utilization efficiency of light, and displaying images in full color.

A display device according to an aspect of the present invention includes: a light source to emit illumination light; a display element having a plurality of pixels to modulate the illumination light; an irradiation optical system to irradiate illumination light emitted from the light source onto some of the pixels; and an illumination light scanning device to scan the illumination light irradiated by the irradiation optical system. The irradiation optical system include an image forming device to condense the illumination light emitted by the light source to form an image and an image re-forming device to form the image formed by the image forming device on the display element. Illumination light irradiated onto the display element is irradiated onto the display element by at least the image forming device and the image re-forming device.

According to such a structure, since the display device includes an irradiation optical system to irradiate illumination light onto some pixels of the display element and the illumination light scanning device to scan the illumination light irradiated by the irradiation optical system, illumination light is not instantaneously irradiated onto only some pixels of the display element by the irradiation optical system. However, the illumination light scanning device scans illumination light in a certain range of time. Therefore, it is possible to irradiate illumination light having a uniform illumination distribution onto all of the pixels of the display element. As a result, human eyes can sense the images displayed on the entire display element.

At this time, when attention is paid to some pixels, illumination light sometimes reaches the pixels and sometimes does not reach the pixels. Therefore, a phenomenon known as intermittent image display occurs. As a result, even when a hold type display element to display light having a brightness required to display an image on every pixel for a predetermined time or a time integration type display element to modulate illumination light irradiated for a predetermined time every time and displaying the illumination light on every pixel is used, it is possible to intermittently display images according to the structure of an aspect of the present invention. Therefore, it is possible to reduce the blurriness of dynamic images caused by the display element by simply displaying continuous images, and to enhance the quality of dynamic images. As a result, the present invention is useful in cases where dynamic images are to be displayed using as a display element a spatial light modulation element, such as a liquid crystal panel to modulate illumination light and thereby displaying images onto a display element.

Since it is not necessary to intermittently turn light sources on and off and to arrange a plurality of light sources in a plane for uniform illumination, limitations on the light sources are small. Furthermore, the irradiation optical system includes an image forming device to condense illumination light emitted from the light sources, thereby forming an image, and image re-forming device to form the image formed by the image forming device on the display element. Illumination light irradiated onto the display element is irradiated by at least the image forming device and the image re-forming device. A surface on which the image formed by the image forming device is formed is a shared surface that forms an image formation region (a region in which a plurality of pixels capable of modulating illumination light are formed) of the display element. Therefore, it is also possible to form an image in a specific pixel by changing the shape or the magnitude of beams of illumination light emitted from the light sources, thereby forming an image by the image forming device, and by re-forming the image on the display element by the image re-forming device.

In particular, since it is possible to effectively irradiate illumination light to a specific pixel without limiting the illumination light by the light-shielding member, etc., it is possible to use almost partial light from the light sources, with small loss of light. Also, since it is possible to relay light by the image re-forming device, it is possible to effectively transmit light even though the optical path of the optical system becomes longer. As a result, it is possible to obtain a display device with a high utilization efficiency of light.

Also, according to an aspect of the present invention, the illumination light is irradiated onto some pixels of the display element device so that an illuminated region and a non-illuminated region capable of enhancing the image quality of dynamic images by intermittent turning-on exists in the image formation region of the display element in a certain ratio. Therefore, when the illuminated region and the non-illuminated region capable of enhancing the image quality of dynamic images by the intermittent turning-on exist in the image formation region of the display element in a certain ratio, the shape of the image formation region illuminated by illumination light, or the distribution of the brightness of illumination light, is not limited.

According to an aspect of the display device according to the present invention, the illumination light scanning device includes a rotating prism to change the refracting angle of the illumination light by the rotation thereof, thereby scanning the illumination light, and the position of an image formed by the image forming device is positioned inside or around the rotating prism.

According to such a structure, the diameter of beams of illumination light is very small in the image forming position in order to condense illumination light emitted from the light sources and to form an image. Therefore, when an image formed by the image forming device exists inside or around a rotating prism, the rotating prism can effectively transmit light, although the rotating prism is unnecessarily large. Therefore, it is possible to design the rotating prism to be small by controlling the refractive index of the rotating prism and thereby to miniaturize and lighten the display device. Also, since the rotating prism changes the refracting angle of the illumination light, thereby scanning the illumination light while rotating, it is possible to scan the illumination light while shifting the optical axis thereof in parallel. Therefore, it is possible to scan the illumination light to the display element while making the incidence angle of the illumination light constant as compared with the illumination light scanning device to scan the illumination light by changing the angle of illumination light by reflection. As a result, it is possible to illuminate the entire region to be illuminated in the same state and thereby display images with uniform image quality.

A projector according to an aspect of the present invention includes a projecting device to project images of the display element in the above-mentioned display device.

According to such a structure, similar to the above-mentioned display device, it is possible to realize a projector capable of enhancing the image quality of dynamic images, reducing limitations on the light sources, and enhancing the utilization efficiency of light. Furthermore, since it is possible to project the image of the display element by the projecting device, it is possible to realize a large screen image when an enlarged image is projected.

According to an aspect of the projector of the present invention, illumination light is divided into two or more colored light components after passing through the illumination light scanning device. The image re-forming device is arranged in each colored light component and forms the image formed by the image forming device on the display element corresponding to each colored light component.

According to such a structure, since illumination light is divided into a plurality of colored light components, it is possible to display images in full color, without color filters, when the respective colored light components are modulated, thereby forming image light by the display elements corresponding to the respective light components. Also, since the image re-forming devices are arranged to correspond to the respective colored light components, it is possible to correctly irradiate illumination light onto some pixels of the respective display elements when the image forming position is controlled by the image re-forming device, even though the distances from the light sources to the display elements corresponding to the respective colored light components are different from each other, thereby easily reducing the slowness of dynamic images.

Even when the distances from the light sources to the display elements corresponding to the respective colored light components are the same, it is possible to correct the deviation in image forming states that vary depending on the wavelengths of the respective colored light components in each colored light component by the image re-forming device. Therefore, it is possible to correctly irradiate illumination light onto some pixels of the respective display elements, and thereby easily reduce the slowness of dynamic images. That is, it is not possible to reduce or prevent the slowness of dynamic images because intermittent display cannot be effectively performed when the positions of the respective display elements onto which the respective colored light components are irradiated or the movements of the colored light components are not uniform.

However, it is possible to easily realize a structure capable of reducing or preventing the slowness of dynamic images by arranging the image re-forming device corresponding to the respective colored light components. Furthermore, since the illumination light is divided into two or more colored light components after passing through the illumination light scanning it is possible to enhance the quality of dynamic images while displaying images in full color even if there is one illumination light scanning device.

According to an aspect of the projector of the present invention, illumination light emitted from the light source is divided into two or more colored light components. The image re-forming device and the illumination light scanning device are arranged in each colored light component. The image re-forming device forms the image formed by the image forming device on the display element corresponding to each colored light component. The illumination light scanning device scans the illumination light divided into respective colored light components so that the projected positions of the images formed by the image re-forming device are almost the same when the images of the display elements corresponding to the respective colored light components are projected so as to be overlapped.

According to such a structure, since illumination light can be divided into a plurality of colored light components, it is possible to display images in full color without color filters when the respective colored light components are modulated, thereby forming image light by the display elements corresponding to the respective colored light components. Also, since the image re-forming device corresponding to the respective colored light components are arranged, it is possible to correctly irradiate illumination light onto some pixels of the respective display elements when the image forming position is controlled by the image re-forming device, even though the distances from the light sources to the display elements corresponding to the respective colored light components are different from each other, and thereby easily reduce the slowness of dynamic images.

Even when the distances from the light sources to the display elements corresponding to the respective colored light components are the same, it is possible to correct the deviation in image forming states that vary depending on the wavelengths of the respective colored light components in each colored light component by the image re-forming device. Therefore, it is possible to correctly irradiate illumination light onto some pixels of the respective display elements, and thereby easily reduce the slowness of dynamic images. It is not possible to prevent the slowness of dynamic images because intermittent display cannot be effectively performed when the positions of the respective display elements onto which the respective colored light components are irradiated or the movements of the colored light components are not uniform. However, it is possible to easily realize a structure capable of reducing the slowness of dynamic images by arranging the image re-forming device corresponding to the respective colored light components. Moreover, the illumination light scanning device can intermittently display images in the respective colors to which the images of the display elements are repeatedly projected in order to scan the illumination light divided into respective colored light components, so that the projected positions of the images formed by the image re-forming device are uniform when the images of the display elements corresponding to the respective colored light components are repeatedly projected. Therefore, it is possible to reduce the slowness of dynamic images caused by the display element by simply displaying continuous images, and to obtain optimal images, without the flickering of colors in which colors are divided.

Also, since the illumination light scanning devices are arranged in each colored light component, it is possible to optimize the position and the material of the illumination light scanning devices and the coating of the surface of the illumination light scanning devices in each colored light component, with consideration to the deviation in image forming states dependent on the wavelengths of the respective colored light components. Therefore, it is possible to more correctly irradiate illumination light onto some pixels of the respective display elements and thereby easily reduce the slowness of dynamic images.

According to an aspect of the projector of the present invention, illumination light emitted from the light source is divided into two or more colored light components, the image re-forming device and the illumination light scanning device are arranged in each colored light component. At least one component of the colored light is divided into two or more colored light components after passing through the illumination light scanning device. The image re-forming device forms the image formed by the image forming device on the display element corresponding to each colored light component. The illumination light scanning device scans the illumination light divided into respective colored light components so that the projected positions of the images formed by the image re-forming device are almost the same when the images of the display elements corresponding to the respective colored light components are projected so as to be overlapped.

According to such a structure, it is possible to display images in full color as in the above-mentioned structure, and thereby easily reduce the slowness of dynamic images. Also, since the illumination light scanning device is arranged in each colored light component, it is possible to optimize the position and the material of the illumination light scanning device and the coating of the surface of the illumination light scanning device in each colored light component, with consideration to the deviation in image forming states dependent on the wavelengths of the respective colored light components. Furthermore, since at least one colored light component of the illumination light divided into respective colored light components is divided into two or more colored light components after passing through the illumination light scanning device, only one illumination light scanning device is provided in the colored light component divided after passing through the illumination light scanning device. Therefore, it is possible to design an optical system in which the number of illumination light scanning devices is as small as possible, with consideration to the deviation in image forming states and dependent on the wavelengths of the respective colored light components by arranging the illumination light scanning means in each colored light component.

According to an aspect of the projector of the present invention, the distances from the light source to the display elements corresponding to the respective colored light components are almost the same for each colored light component.

According to such a structure, since the distances from the light sources to the display elements corresponding to the respective colored light components are almost the same for each colored light component, it is possible to irradiate illumination light divided into respective colored light components onto some pixels of the respective display elements with illumination regions of the same size. Also, since the characteristics of the image re-forming device corresponding to the respective colored light components are similar, some parts of the image re-forming device may be shared. As a result, it is possible to reduce the number of parts by sharing some parts of the image re-forming device. It is also possible to correct the deviation in image forming states dependent on the wavelengths of the respective colored light components in each colored light component by using the parts of the image re-forming device of the respective colored light components that are not shared. Furthermore, it is possible to easily design the image re-forming device in this case compared with a case where the distance from the light sources to the display elements corresponding to the respective colored light component are different from each other in each colored light component. Therefore, it is possible to correctly irradiate illumination light onto some pixels of the respective display elements, and thereby easily reduce the slowness of dynamic images.

According to an aspect of the projector of the present invention, the distances from the light source to the positions of the images of the respective colored light components formed by the image forming device are almost the same for each colored light component.

According to such a structure, since the distances from the light sources to the positions of the images of the respective colored light components, which are formed by the image forming device are almost the same for each colored light component, it is possible to form images of the respective colored light components of the same size in a structure where illumination light is divided into a plurality of colored light components between the light sources and the illumination light scanning device. Therefore, when the images are finally formed on the display elements corresponding to the respective colored light components by the image re-forming device, it is possible to correctly irradiate illumination light onto some pixels of the respective display elements, and thereby easily enhance the utilization efficiency of light and reduce the slowness of dynamic images.

According to an aspect of the projector of the present invention, the distances from the positions of the images of the respective colored light components, which are formed by the image forming device, to the display elements corresponding to the respective colored light components are almost the same for each colored light component.

According to such a structure, since the distances from the positions of the images of the respective colored light components formed by the image forming device, to the display elements corresponding to the respective colored light component are almost the same for each colored light component, it is possible to correctly irradiate illumination light onto some pixels of the respective display elements in a structure where the illumination light is divided into a plurality of colored light components between the light sources and the illumination light scanning device and thereby easily enhance the utilization efficiency of light and reduce the slowness of dynamic images. Also, since the characteristics of the image re-forming device are similar, some parts of the image re-forming device may be shared. As a result, it is possible to reduce the number of parts by sharing some parts of the image re-forming device. It is possible to correct the deviation in image forming states dependent on the wavelengths of the respective colored light components in each colored light component by using the parts of the image re-forming device of the respective colored light components that are not shared.

Since the display device and the projector according to an aspect of the present invention include an irradiation optical system to irradiate the illumination light onto some pixels of the display element, and illumination light scanning device to scan the illumination light irradiated by the irradiation optical system, illumination light is not instantaneously irradiated onto only some pixels of the display element by the irradiation optical system. However, the illumination light scanning device irradiates the illumination light in a certain range of time. Therefore, it is possible to irradiate illumination light having a uniform illumination distribution onto all of the pixels of the display element. As a result, human eyes can sense the images displayed on the entire display element. At this time, when attention is paid to some pixels, illumination light sometimes reaches the pixels and sometimes does not reach the pixels. Therefore, the phenomenon known as "intermittent display" occurs. As a result, even when the hold type display element to display light having a brightness required to display an image on every pixel for a predetermined time or a time integration type display element to modulate illumination light irradiated for a predetermined time every time and displaying the illumination light on every pixel is used, it is possible to intermittently display images according to the structure of an aspect the present invention. Therefore, it is possible to reduce the slowness of dynamic images caused by the display element by simply displaying continuous images, and to enhance the quality of dynamic images. Also, since it is not necessary to intermittently turn light sources on and off, and to arrange a plurality of light sources in a plane for uniform illumination, limitations on the light sources are small.

Furthermore, the irradiation optical system includes an image forming device to condense illumination light emitted from the light sources, thereby forming an image and an image re-forming device to form the image formed by the image forming device on the display element. Illumination light irradiated onto the display element is irradiated onto the display element by at least the image forming device and the image re-forming device. Therefore, if only an image in which the illumination light can be irradiated onto specific pixels by such an illumination optical system is formed, it is possible to effectively irradiate illumination light onto specific pixels without limiting the illumination light by the light-shielding member and thereby to reduce the loss of light and to use partial light components from the light sources. Therefore, it is possible to realize a display device and a projector capable of enhancing the utilization efficiency of light.

Furthermore, in an aspect of the present invention, the distances from the light sources to the optical parts are almost the same for each colored light component in the projector where illumination light is divided into two or more colored light components. Therefore, it is possible to realize a structure in which the respective colored light components are correctly irradiated onto the display elements when the illumination region are the same size and the scanning directions of the respective colored light components are the same. As a result, it is possible to enhance the quality of dynamic images and the utilization efficiency of light and to display images in full color. Also, it is possible to share optical parts, and thereby reduce the number of parts by making the distances from the light sources to the optical parts almost the same for each colored light component in a projector where illumination light is divided into two or more colored light components.

BRIEF DESCRIPTION OF THE DRAWINGS

FIG. 1 is a schematic of a display device according to the first exemplary embodiment of the present invention;

FIGS. 2(*a*)–2(*d*) are schematics of the operation of a rotating prism in detail;

FIGS. 3(*a*)–3(*e*) are schematics of the scanning of illumination light to the inside of an image formation region by the rotation of the rotating prism;

FIG. 4 is a schematic of a projector according to a modification of the first exemplary embodiment of the present invention;

FIG. 5 is a schematic of a projector according to the second exemplary embodiment of the present invention;

FIG. 6 is a perspective view of a projector according to the third exemplary embodiment of the present invention;

FIGS. 7(*a*) and 7(*b*) are sectional views of the projector according to the third exemplary embodiment of the present invention;

FIGS. 8(*a*) and 8(*b*) are sectional views of a modification of a third exemplary embodiment of the present invention;

FIG. 9 is a schematic of a projector according to the fourth exemplary embodiment of the present invention;

FIG. 10 is a schematic of a projector according to the fifth exemplary embodiment of the present invention;

FIG. 11 is a schematic of a projector according to the sixth exemplary embodiment of the present invention;

FIG. 12 is a schematic of a display device according to the seventh exemplary embodiment of the present invention; and FIG. 13 is a schematic of a display device according to the eighth exemplary embodiment of the present invention.

DETAILED DESCRIPTION OF PREFERRED EMBODIMENTS

The present invention will now be explained in detail with reference to the figures. The present invention is not limited to the exemplary embodiments thereof.

First Exemplary Embodiment

FIG. 1 illustrates a display device according to the first exemplary embodiment of the present invention. A display device 100 includes a light source lamp 110 (a light source), fly eye lenses 121 and 122, a superposing lens 123, a collimating lens 124 (image forming device), a rotating prism 130 (illumination light scanning device), image re-forming lenses 141, 142, and 143 (image re-forming means), and a liquid crystal light valve 150 (a display element).

The respective parts will be described in detail. The light source lamp 110 includes a lamp 111 that serves as a light source and a concave mirror 112. The lamp 111 includes, for example, a discharge lamp, such as a high-pressure mercury lamp. Further, the concave mirror 112 includes a parabolic mirror. Moreover, the structures of the lamp 111 and the concave mirror 112 are not limited thereto and can be appropriately modified. Furthermore, it is not necessary to intermittently turn on and off the lamps that serve as light sources and to arrange a plurality of lamps in a plane for uniform illumination.

In the light source lamp 110, the lamp 111 emits illumination light and the concave mirror 112 reflects the illumination light to the fly eye lenses 121 and 122. At this time, when a light source, such as a light emission diode (LED), is not diffused to all directions, a condensing lens is used instead of a concave mirror 112 to emit the illumination light to the fly eye lenses 121 and 122, or structures for emitting illumination light or a plurality of light sources are arranged in an array. The kinds, the number, and the structures of light sources may be appropriately modified.

Next, the fly eye lenses 121 and 122, the superposing lens 123, and the collimating lens 124 that constitute the image forming device to condense illumination light emitted from the light sources and forming an image will now be described. The fly eye lenses 121 and 122 are a lens array in which micro-lenses having rectangular outlines are arranged in a matrix. The appearance of each micro-lens is formed such that the ratio thereof is exchanged with the ratio of the appearance of the image formation region (the region including a plurality of pixels capable of modulating illumination light) of the liquid crystal light valve 150 that is the display element seen from the main optical axis of the optical system. The appearance of the image formation region of the liquid crystal light valve 150 is a rectangle in which the aspect ratio is 4:3. The appearance of each micro-lens is a rectangle in which the aspect ratio is 4:1. As for the ratios of the length to the breadth, design change can be freely made by optical systems and the same effect can be obtained even when the ratios of the length to the breadth are different from those of the present exemplary embodiment. Therefore, the relationship among the ratios of the length to the breadth is not limited thereto.

The fly eye lens 121 divides illumination light emitted from the light sources into a plurality of partial light components that are condensed by the respective micro-lenses of the fly eye lens 122. The fly eye lens 122 makes the plurality of divided partial light components incident on the superposing lens 123. The superposing lens 123 condenses the plurality of divided partial light components through the collimating lens 124 and forms an image defined by the appearances of the micro-lenses of the fly eye lens 121 inside the rotating prism 130. In FIG. 1, the image is formed on a plane including the rotation axis of the rotating prism 130. Therefore, the diameter of beams of illumination light that has passed through the rotating prism 130 becomes very small. As a result, illumination light effectively passes through the rotating prism 130. The image formed by the fly eye lenses 121 and 122, the superposing lens 123, and the collimating lens 124 that are the image forming device may be around the rotating prism 130 instead of inside the rotating prism 130. The position of the image is not limited thereto as long as the rotating prism 130 effectively transmits light.

Further, the rotating prism 130 will now be described in detail. When the rotating prism 130 rotates, the optical distances of the respective rays that constitute illumination light, change depending on the rotation states of the rotating prism 130. Therefore, the image forming position partially is displaced back and forth. As a result, when the whole optical system is designed, it is preferable to set the position of the image formed inside or around the rotating prism 130 with consideration to the rotating state, so that the image formed on the display element 150 is optimal. It is possible to appropriately set the relationship between the rotation state of the rotating prism 130 and the image forming position by designing the optical system based on the position of the image formed in a state of being rotated by 45° other than on the rotating position of the rotating prism 130 as illustrated in FIG. 1.

Next, the image re-forming lenses 141, 142, and 143 are the image re-forming device to form the image formed by the fly eye lenses 121 and 122, the superposing lens 123, and the collimating lens 124 that are the image forming device on the liquid crystal light valve 150 that is an display element. Since the image re-forming device are for forming the image formed by the image forming device on the display element, the image re-forming device may be combinations of curved mirrors instead of lenses. Furthermore, the number of lenses or curved mirrors, the magnification and the reduction ratio of an image, and the aspect ratios can be appropriately modified. Also, it does not depart from the scope of the present invention when an image is finally formed on the display element, although the image re-forming device relays the image by forming the image several times. That is, the number of times by which an image is formed by the image re-forming device is not limited to one time.

As mentioned above, the fly eye lenses 121 and 122, the superposing lens 123, and the collimating lens 124 forms an image inside the rotating prism 130 by changing the shape or the size of beams of illumination light emitted from the light source 110. The image re-forming lenses 141, 142, and 143 re-form the image formed by the fly eye lenses 121 and 122, the superposing lens 123, and the collimating lens 124 on the display element. Therefore, it is possible to irradiate illumination light emitted from the light source 110 onto some pixels of the liquid crystal light valve 150 by the irradiation optical system including the fly eye lenses 121 and 122, the superposing lens 123, and the collimating lens 124 that are the image forming device and the image re-forming lenses 141, 142, and 143 that are the image re-forming device. The aspect ratio of the image formation region of the liquid crystal light valve 150 is 4:3, whereas the aspect ratio of the appearance of the fly eye lens 121 is 4:1. Therefore, it is possible to irradiate illumination light having a uniform illumination distribution onto the portion corresponding to ⅓ of the image formation region. Also, with consideration to the structure of the present exemplary embodiment, even though the region (the image formed by the image re-forming device) illuminated by the irradiation optical system is designed to be larger than the size of the image formation region in its horizontal direction (the direction perpendicular to the scanning direction) at any moment, it does not depart from the scope of an aspect of the present invention as long as the region illuminated by the irradiation optical system is a narrower region than the size of the image formation region in its vertical direction (the direction parallel to the scanning direction).

At this time, since the rotating prism 130 is arranged as illumination light scanning device to scan the illumination light, illumination light passes through the rotating prism 130 while the optical axis thereof is shifted. Therefore, the illumination position of the image formation region of the liquid crystal light valve 150 changes. Also, the rotating prism 130 including a quadratic pillar prism made of a glass material changes the refracting angle of the illumination light by the rotation thereof, thereby serving to scan the illumination light. The rotating prism 130 connected to an electron motor (not shown) rotates while the rotation speed thereof is controlled.

FIG. 2 illustrates the operation of the rotating prism 130 in detail. In FIG. 2, a case in which the rotating prism 130 rotates counter-clockwise about the axis thereof perpendicular to the sheet will be described.

The rotation position of the rotating prism 130 illustrated in FIG. 2(*a*) is the position in which the illumination light incident from the left of the figure on the rotating prism 130 goes straight without being refracted and is emitted. The illumination light is described to be light rays parallel to the main optical axis of the optical system for the simplicity of description. Hereinafter, illumination light is described as rays.

The rotation position of the rotating prism 130 illustrated in FIG. 2(*b*) is between 0° and 45° from the rotation position illustrated in FIG. 2(*a*) counter-clockwise. In this case, the illumination light incident from the left side of the figure on the rotating prism 130 is refracted upward in the figure and is emitted from the right side of the figure.

The rotation position of the rotating prism 130 illustrated in FIG. 2(*c*) is between 45° and 90° from the rotation position illustrated in FIG. 2(*a*) in the counter-clockwise direction. In this case, the illumination light incident from the left side of the figure on the rotating prism 130 is refracted downward in the figure and is emitted from the right side of the figure.

The rotation position of the rotating prism 130 illustrated in FIG. 2(*d*) is 90° from the rotation position illustrated in FIG. 2(*a*) in the counter-clockwise direction. In this case, the illumination light incident from the left side of the figure on the rotating prism 130 is straightened, without being refracted, and is emitted as illustrated in FIG. 2(*a*).

Therefore, as illustrated in FIG. 2, illumination light passes through the rotating prism 130, while the optical axis thereof is shifted in parallel in accordance with the relationship between the rotation of the rotating prism 130 and the refractive index. Referring back to FIG. 1, illumination light that has passed through the rotating prism 130 is incident on the liquid crystal light valve 150 that is the display element through the image re-forming lenses 141, 142, and 143. At this time, since illumination light passes through the rotating prism 130, the illumination light is irradiated while being scanned inside the image formation region of the liquid crystal light valve 150.

FIG. 3 illustrates the scanning of the illumination light inside the image formation region of the liquid crystal light valve 150 by the rotation of the rotating prism 130. The illumination light irradiation regions illustrated in FIGS. 3(*a*) to 3(*d*) correspond to the rotation positions of the rotating prism 130, which are illustrated in FIGS. 2(*a*) to 2(*d*). Since the image reforming lenses 141, 142, and 143 are arranged between the rotating prism 130 and the liquid crystal light valve 150, the scanning direction of FIG. 3 is inversed to the scanning direction of FIG. 2. FIG. 3(*e*) illustrates the illumination state integrated for a certain period of time when illumination light is continuously and repeatedly irradiated onto the inside of the image formation region of the liquid crystal light valve 150 illustrated in FIGS. 3(*a*) to 3(*d*).

As illustrated in FIG. 3(*a*), illumination light that has passed through the rotating prism 130 in the rotation position of FIG. 2(*a*) is irradiated onto some pixels of the liquid crystal light valve 150. Specifically, the portion corresponding to ⅓ of the image formation region in the center of the image formation region. When the rotating prism 130 rotates as illustrated in FIGS. 2(*a*) and 2(*b*), the irradiation region is transited so that the illumination light starts to be irradiated from the center of the image formation region of the liquid crystal light valve 150, as illustrated in FIGS. 3(*a*) to 3(*b*). Furthermore, when the rotating prism 130 rotates, as illustrated in FIGS. 2(*b*) to 2(*c*), the irradiation region is transited so that the illumination light starts to be irradiated from the upper end of the image formation region of the liquid crystal light valve 150, as illustrated in FIGS. 3(*b*) to 3(*c*). When the rotating prism 130 rotates, as illustrated in FIGS. 2(*c*) to 2(*d*), and as illustrated in FIGS. 3(*c*) to 3(*d*), the irradiation region is transited from the upper end to the center of the image formation region of the liquid crystal light valve 150. The direction in which electric signals that are the image data of the liquid crystal light valve 150 are written, may correspond to the direction to which illumination light is scanned. The period in which the electric signals that are the image data is written down is may almost be the same as the scanning period of scanning. The illumination light is may be irradiated after enough image data are written in the respective pixels.

Therefore, when the illumination region is integrated for a certain period of time as illumination light is repeatedly scanned to the inside of the image formation region of the liquid crystal light valve 150 at high speed, as illustrated in FIG. 3(*e*), it is possible to irradiate illumination light having a uniform illumination distribution onto the inside of the image formation region. When attention is paid to some pixels in the image formation region, the illumination light sometimes reaches the pixels and sometimes does not reach the pixels. Therefore, the phenomenon known as "intermittent display" occurs. As a result, since it is possible to intermittently display images, even though a hold type display element using liquid crystal is adopted, it is possible to reduce the slowness of dynamic images caused by the hold type display element by simply displaying continuous images, and thereby to enhance the quality of dynamic images. The size of the illumination region in the image formation region (the size of the image formed by the image re-forming device) is not limited to the above and can be appropriately modified. However, it is preferably as narrow as possible in a range where the entire image formation region is illuminated by scanning. This is because it is possible to further reduce the slowness of dynamic images since it is possible to more intermittently display the images. Specifically, the area of the illumination region is preferably no more than ½ of the area of the image formation region. With consideration to the structure of the present exemplary embodiment, even though the illumination light is irradiated onto the position that exceeds the length in the longitudinal direction of the image formation region by scanning the illumination light, it does not depart from the scope of an aspect of the present invention as long as illumination light is scanned in the image formation region.

Referring back to FIG. 1, the liquid crystal light valve 150 has a structure in which polarizers are included in front of and behind the liquid crystal light valve 150 and red, green, and blue color filters are regularly arranged in each of a plurality of pixels that form the image formation region of the liquid crystal light valve 150. Therefore, when illumination light incident on the image formation region of the liquid crystal light valve 150 is modulated in each pixel based on electric signals that become the image data, an image is finally displayed on the liquid crystal light valve 150 in full color.

According to the present exemplary embodiment, the image displayed on the liquid crystal light valve 150 may be projected to a screen (not shown) by arranging a projection lens 160 (projection device) having almost the same structure as that of the display device 100 of the projector 101 illustrated in FIG. 4. The image may be projected from the front or rear surface of the screen. Curved mirrors rather than the projection lenses 150 may be used as the projection device.

As mentioned above, the display device 100 or the projector 101 includes the light source to emit illumination light, a liquid crystal light valve 150 having the plurality of pixels capable of modulating the illumination light, a irradiation optical system to irradiate illumination light emitted from the light source onto some pixels of the liquid crystal light valve 150, and a rotating prism 130 to scan the illumination light irradiated by the irradiation optical system. The irradiation optical system includes fly eye lenses 121 and 122, a superposing lens 123 and a collimating lens 124 as the image forming device to condense illumination light emitted from the light source, thereby forming an image, and image re-forming lenses 141, 142, and 143 as the image re-forming device to form the image formed by the image forming device on the liquid crystal light valve. Only a part of the image formation region of the liquid crystal light valve is instantaneously illuminated by the irradiation optical system with a uniform illumination distribution. However, since the illumination light irradiation device scans the illumination light inside the image formation region for a certain range of time, the illumination light having a uniform illumination distribution is irradiated onto the entire image formation region. Therefore, human eyes can sense the image. When attention is paid to some pixels of the image formation region, illumination light sometimes reaches the pixels and sometimes does not reach the pixels. Therefore, the phenomenon known as the intermittent display may occur. As a result, even when a hold type display element using liquid crystal is used, it is possible to intermittently display images. Therefore, it is possible to reduce the slowness of dynamic images caused by the hold type display element by simply displaying continuous images, and thereby to enhance the quality of dynamic images.

Also, since it is not necessary to intermittently turn the light sources on and off and to arrange the plurality of light sources in a plane for uniform illumination, limitations on the light sources are small. Furthermore, since the image formed by condensing illumination light emitted from the light sources is formed on the display element by the image re-forming device in the irradiation optical system, it is possible to effectively irradiate illumination light emitted from the light sources onto specific pixels and thereby to reduce the loss of light. As a result, it is possible to use almost all of the light components emitted from the light sources.

Therefore, it is possible to provide a display device and a projector capable of enhancing the quality of dynamic images, reducing limitations on the light sources, enhancing the utilization efficiency of light, and displaying images in full color. According to the present exemplary embodiment, fly eye lenses 121 and 122, a superposing lens 123, and a collimating lens 124 are used as the image forming device. An image forming lens that forms the image formed by the fly eye lenses 121 and 122, the superposing lens 123, and the collimating lens 124 may be used as the image forming device. Therefore, it does not depart from the scope of an aspect of the present invention when an image is formed on some pixels of the display element by the image re-forming device to form the image formed by the fly eye lenses 121 and 122, the superposing lens 123, the collimating lens 124, and the image forming lens on the display element. That is, the number of times by which the image is formed by the image forming device is not limited to one time.

Second Exemplary Embodiment

According to the present exemplary embodiment described hereinafter, the same members as those of the above-mentioned exemplary embodiment are denoted by the same reference numerals and the description of the same operations is omitted. In cases where members have the same name, although they are denoted by different reference numerals, they have almost the same function. Therefore, the basic description thereof is omitted.

FIG. 5 illustrates a projector according to the second exemplary embodiment of the present invention. A projector 201 includes a light source lamp 110, fly eye lenses 121 and 122, a superposing lens 123, a collimating lens 124, a rotating prism 130, a color dividing dichroic prism 271, reflecting mirrors 281R, 282R, 281B, and 282B, image re-forming lenses 241R, 242R, 243R, 241G, 242G, 243G, 241B, 242B, and 243B, liquid crystal light valves 250R, 250G, and 250B, a color synthesizing dichroic prism 272, and a projection lens 260.

For the simplicity of description, the components of illumination light emitted from the light sources are displayed by respective divided colored light components. The respective colored light components are illustrated in FIG. 5 as rays parallel to the main optical axis of the optical system. The distance from the light source 110 to the rotating prism 130 in FIG. 5 is the same as that in FIG. 1. However, FIG. 5 is obtained by rotating FIG. 1 by 90° using the main optical axis of the optical system as a rotation axis.

First, illumination light emitted from the light source lamp 110 passes through the fly eye lenses 121 and 122 and the superposing lens 123. The superposing lens 123 condenses a plurality of divided partial light components and forms the image defined by the appearance of the micro-lens of the fly eye lens 121 through the collimating lens 124 inside the rotating prism 130. Meanwhile the aspect ratio of the image formation regions of the liquid crystal light valves 250R, 250G, and 250B is 4:3. The aspect ratio of the appearance of each micro-lens is 4:1.

Illumination light that has passed through the rotating prism 130 is incident on the color dividing dichroic prism 271. The color dividing dichroic prim 271 including of four triangular prisms bonded to each other, forms an optical multi-layered film to reflect red colored light to the surface on which the triangular prisms are bonded, thereby transmitting green colored light, and an optical multi-layered film to reflect blue colored light, thereby transmitting green colored light, divides incident illumination light into red colored light, green colored light, and blue colored light, and separately emits respective colored light components in three directions. Therefore, illumination light incident on the color dividing dichroic prism 271 is divided into red colored light 290R, green colored light 290G, and blue colored light 290B. Therefore, illumination light emitted from the light source 110 is divided into two or more colored light components after passing through the rotating prism that is the illumination scanning device.

Moreover, optical parts with the same color dividing function may be used as the color dividing dichroic prism in which two glass plates having the same optical multi-layered films cross each other.

First, red colored light 290R is guided to the liquid crystal light valve 250R by reflecting mirrors 281R, and 282R and image re-forming lenses 241R, 242R, and 243R. At this time, the image re-forming lenses 241R, 242R, and 243R form the image formed by the fly eye lenses 121 and 122, the superposing lens 123, and the collimating lens 124 that are the image forming device on the liquid crystal light valve 250R that is the display element.

Green colored light 290G is guided to the liquid crystal light valve 250G by the image re-forming lenses 241G, 242G, and 243G. At this time, the image re-forming lenses 241G, 242G, and 243G form the image formed by the fly eye lenses 121 and 122, the superposing lens 123, and the collimating lens 124 that are the image forming device on the liquid crystal light valve 250G that is the display element.

Blue colored light 290B is guided to the liquid crystal light valve 250B by the reflecting mirrors 281B and 282B and the image re-forming lenses 241B, 242B, and 243B. At this time, the image re-forming lenses 241B, 242B, and 243B form the image formed by the fly eye lenses 121 and 122, the superposing lens 123, and the collimating lens 124 that are the image forming device on the liquid crystal light valve 250B that is the display element.

Therefore, it is possible to irradiate illumination light having a uniform illumination distribution onto the portion corresponding to ⅓ of the image formation region of each of the liquid crystal light valves 250R, 250G, and 250B. Since the rotating prism 130 as illumination light scanning device is arranged, illumination light passes through the rotating prism while the optical axis thereof is shifted in accordance with the relationship between the rotation of the rotating prism and the refractive index. Therefore, the respective divided colored light components are uniformly irradiated onto all of the image formation regions while scanning all of the image formation regions of the respective liquid crystal light valves 250R, 250G, and 250B. As a result, it is possible to irradiate illumination light having a uniform illumination distribution onto the image formation regions by integrating the illumination region for a certain period of time as illumination light is repeatedly scanned to the image formation regions of the liquid crystal light valves 250R, 250G, and 250B at high speed. When attention is paid to some of the image formation regions, the illumination light sometimes reaches the parts and sometimes does not reach the parts. Therefore, the phenomenon known as the "intermittent turning-on" occurs.

Referring back to FIG. 5, the respective colored illumination light components incident on the image formation regions of the liquid crystal light valves 250R, 250G, and 250B are modulated based on electric signals in the image formation regions of the liquid crystal light valves 250R, 250G, and 250B and are guided to the projection lens by the color synthesizing dichroic prism 272. Further, the dichroic prism 272, including of four triangular prisms bonded to each other, forms an optical multi-layered film to reflect red colored light to the surface to which the four triangular prisms are bonded, thereby transmitting the green colored light and an optical multi-layered film to reflect the blue colored light, thereby transmitting green colored light, synthesizes the red colored light, the green colored light, and the blue colored light separately incident from three directions, and emits the synthesized light to the projection lens 260. Each of the liquid crystal light valves 250R, 250G, and 250B has a structure in which two polarizers are arranged in front of and behind the liquid crystal light valve. However, the red, green, and blue color filters are not arranged in each pixel as in the first exemplary embodiment.

Illumination light incident on the projection lens is projected to a screen (not shown), thereby displaying an image to the screen. At this time, since the images of the liquid crystal light valves 250R, 250G, and 250B to modulate red colored light, green colored light, and blue colored light overlap on the screen, it is possible to display the images in full color. In the images projected to the screen, the positions of the images corresponding to the respective colored light components, which are formed by a group of image re-forming lenses, are the same. That is, when the image formed by the image re-forming lens is formed in the center of the image formation region of the liquid crystal light valve 250R at any moment, an image formed by the image re-forming lenses is also formed in the center of the image formation region of the liquid crystal light valve 250G or the liquid crystal light valve 250B. The scanning directions or speed of the images corresponding to the respective colored light components are the same.

As mentioned above, according to the second exemplary embodiment, the projector 201 includes the light source to emit illumination light, the liquid crystal light valves 250R, 250G, and 250B having a plurality of pixels to modulate the illumination light, an irradiation optical system to irradiate illumination light emitted from the light source onto some pixels of the liquid crystal light valves 250R, 250G, and 250B, and the rotating prism 130 to scan the illumination light irradiated by the irradiation optical system. The irradiation optical system includes fly eye lenses 121 and 122, a superposing lens 123, and a collimating lens 124 as the image forming device to condense illumination light emitted from the light source, thereby forming an image, and image re-forming lenses 241R, 242R, 243R, 241G, 242G, 243G, 241B, 242B, and 243B as the image re-forming device to form the image formed by the image forming device on the liquid crystal light valves. As a result, it is possible to realize a projector capable of enhancing the quality of dynamic images, of reducing limitations on the light sources, of enhancing the utilization efficiency of light, and of displaying images in full color without using color filters.

Furthermore, the illumination light is divided into two or more colored light components after passing through the rotating prism 130 that is the illumination light scanning device. The image re-forming lens arranged in each colored light component forms the image formed by the fly eye lenses 121 and 122, the superposing lens 123, and the collimating lens 124 that are the image forming device on the liquid crystal light valves 250R, 250G, and 250B corresponding to the respective colored light components. Therefore, it is possible to surely irradiate illumination light onto some pixels of each liquid crystal light valve by the image re-forming lens arranged in each colored light component although the distances from the light sources to the liquid crystal light valves corresponding to the respective colored light components are different from each other. As a result, it is possible to reduce the slowness of dynamic images and to enhance the utilization efficiency of light.

Third Exemplary Embodiment

According to the present exemplary embodiment described hereinafter, the same members as those of the above-mentioned exemplary embodiments are denoted by the same reference numerals and the description of the same operations is omitted. In cases where members have the same name, although they are denoted by different reference numerals, they have almost the same function. Therefore, the basic description thereof is omitted.

FIG. 6 is a perspective view of a projector according to the third exemplary embodiment of the present invention. The projector 301 includes a light source lamp 110, fly eye lenses 121 and 122, a superposing lens 123, a collimating lens 124, a rotating prism 130, a color dividing dichroic prism 271, reflecting mirrors 381R, 382R, 381G, 382G, 381B, and 382B, image re-forming lenses 341, 342R, 343R, 342G, 343G, 342B, and 343B, liquid crystal light valves 250R, 250G, and 250B, a color synthesizing dichroic prism 272, and a projection lens 260.

The third exemplary embodiment is different from the second exemplary embodiment in that the axis on which the color dividing surfaces of the color dividing dichroic prism 271 cross each other overlaps the axis on which the color synthesizing surfaces of the color synthesizing dichroic prism 272 cross each other, so that the two axes are arranged on the same axis. Also, some parts of the image re-forming lenses arranged in the respective colored light components are shared.

The structure of the projector will now be described in detail with reference to FIG. 7. FIG. 7(*a*) is a sectional view of the projector 301, which is taken along the plane including the plane A in FIG. 6. FIG. 7(*b*) is a sectional view of the projector 301, which is taken along the plane including the plane B in FIG. 6.

For the simplicity of description, the components of illumination light emitted from the light sources are displayed by respective divided colored light components. The respective colored light components are described in FIG. 7 as rays parallel to the main optical axis of the optical system.

First, illumination light emitted from the light source lamp 110 passes through the fly eye lenses 121 and 122 and the superposing lens 123. The superposing lens 123 condenses a plurality of divided partial light components and forms the image defined by the appearance of the micro-lens of the fly eye lens 121 through the collimating lens 124 inside the rotating prism 130. Meanwhile the aspect ratio of the image formation regions of the liquid crystal light valves 250R, 250G, and 250B is 4:3, the aspect ratio of the appearance of each micro-lens is 4:1.

Illumination light that has passed through the rotating prism 130 is incident on the color dividing dichroic prism 271 via the image re-forming lens 341. Illumination light incident on the color dividing dichroic prism 271 is divided into red colored light 390R, green colored light 390G, and blue colored light 390B.

Red colored light 390R is guided to the liquid crystal light valve 250R by the reflecting mirrors 381R and 382R and the image re-forming lenses 342R and 343R on a roughly U-shaped optical path. At this time, the image re-forming lenses 341, 342R, and 343R form the image formed by the fly eye lenses 121 and 122, the superposing lens 123, and the collimating lens 124 that are the image forming device on the liquid crystal light valve 250R that is the display element.

Green colored light 390G is guided to the liquid crystal light valve 250G by the reflecting mirrors 381G and 382G and the image re-forming lenses 342G and 343G on the roughly U-shaped optical path. At this time, the image re-forming lenses 341, 342G, and 343G form the image formed by the fly eye lenses 121 and 122, the superposing lens 123, and the collimating lens 124 that are the image forming device on the liquid crystal light valve 250G that is the display element.

Blue colored light 390B is guided to the liquid crystal light valve 250B by the reflecting mirrors 381B and 382B and the image re-forming lenses 342B and 343B on the roughly U-shaped optical path. At this time, the image re-forming lenses 341, 342B, and 343B form the image formed by the fly eye lenses 121 and 122, the superposing lens 123, and the collimating lens 124 that are the image forming device on the liquid crystal light valve 250B that is the display element.

Therefore, it is possible to irradiate illumination light having a uniform illumination distribution onto the portion corresponding to ⅓ of the image formation region of each of the liquid crystal light valves 250R, 250G, and 250B. Since a rotating prism 130 is arranged as illumination light irradiating device, illumination light passes through the rotating prism while the optical axis thereof is shifted in accordance with the relationship between the rotation of the rotating prism and the refractive index. Therefore, the respective divided colored light components are uniformly irradiated onto all of the image formation regions while scanning all of the image formation regions of the liquid crystal light valves 250R, 250G, and 250B. As a result, it is possible to irradiate illumination light having a uniform illumination distribution onto the image formation regions by integrating the illumination region for a certain period of time as illumination light is repeatedly scanned to the image formation regions of the liquid crystal light valves 250R, 250G, and 250B at high speed. When attention is paid to some of the image formation regions, the illumination light sometimes reaches the parts or sometimes does not reach the parts. Therefore, the phenomenon known as "intermittent turning-on" occurs.

Referring back to FIG. 7, the respective colored illumination light components incident on the image formation regions of the liquid crystal light valves 250R, 250G, and 250B are modulated in the image formation regions of the liquid crystal light valves 250R, 250G, and 250B based on electric signals and are guided to the projection lens by the color synthesizing dichroic prism 282.

Illumination light incident on the projection lens 260 is projected to a screen (not shown) thereby to display an image on the screen. At this time, since the images of the liquid crystal light valves 250R, 250G, and 250B to modulate red colored light, green colored light, and blue colored light overlap on the screen, it is possible to display the images in full color. In the images projected to the screen, the positions of the images corresponding to the respective colored light components, which are formed by a group of image re-forming lenses, are the same. That is, when the image formed by the image re-forming lens is formed in the center of the image formation region of the liquid crystal light valve 250R at any moment, an image formed by the image re-forming lenses is also formed in the center of the image formation region of the liquid crystal light valve 250G or the liquid crystal light valve 250B. The scanning directions or speed of the images corresponding to the respective colored light components are the same.

As mentioned above, according to the third exemplary embodiment, the projector 301 includes a light source to emit illumination light, liquid crystal light valves 250R, 250G, and 250B having a plurality of pixels to modulate the illumination light, an irradiation optical system to irradiate illumination light emitted from the light source onto some pixels of the liquid crystal light valves 250R, 250G, and 250B, and the rotating prism 130 to scan the illumination light irradiated by the irradiation optical system. The irradiation optical system includes fly eye lenses 121 and 122, a superposing lens 123, and a collimating lens 124 as the image forming device to condense illumination light emitted from the light source, thereby forming an image, and image re-forming lenses 341, 342R, 343R, 342G, 343G, 342B, and 343B as the image re-forming device to form the image formed by the image forming device on the liquid crystal light valves. As a result, it is possible to realize a projector capable of enhancing the quality of dynamic images, of reducing limitations on the light sources, of enhancing the utilization efficiency of light, and of displaying images in full color as in the second exemplary embodiment.

Furthermore, since the distances from the light sources to the liquid crystal light valves 250R, 250G, and 250B corresponding to the respective colored light components or the distances from the positions of the images of the respective colored light components, which are formed by the image forming device, to the liquid crystal light valves 250R, 250G, and 250B are almost the same in the respective colored light components, it is possible to irradiate illumination light divided into respective colored light components onto some pixels of the respective liquid crystal light valves with illumination regions of the same size. Therefore, even when the image re-forming lens 341, that is a part of the image re-forming device is shared, it matters little because the characteristics of the image re-forming lenses of the respective colored light components are similar to each other. It is possible to correct the deviation of the image forming states dependent on the difference in the wavelengths of the respective colored light components in each colored light component by optimizing the image re-forming lenses 342R, 343R, 342G, 343G, 342B, and 343B of the respective colored light components that are not shared. Since the image re-forming device are easily designed, it is possible to correctly irradiate illumination light onto some pixels of the respective display elements. Therefore, it is possible to reduce the slowness of dynamic image and to enhance the utilization efficiency of light.

Since the axis on which the color dividing surfaces of the color dividing dichroic prism 271 cross each other, and the axis on which the color synthesizing surfaces of the color synthesizing dichroic prism 272 cross each other, are arranged on the same axis, when almost the same optical parts are arranged in each colored light component, it is possible to make the shapes of the illumination regions of the respective colored light components almost the same and to make the scanning directions of the illumination light the same. Therefore, since optical parts to make the scanning directions the same are not necessary, it is possible to simply and compactly form the optical system.

According to the present exemplary embodiment, the image re-forming lens 341 is shared by the respective colored light components; however, it may not be shared as described in the second exemplary embodiment. The reflecting mirror whose optical path is bent may be appropriately arranged between the light source lamp 110 and the color dividing dichroic prism 271 so that the light source lamp 110 does not intercept the light projected from the projection lens 260.

As in the projector 302 illustrated in FIG. 8, reflection type liquid crystal panels 351R, 351G, and 351B and polarization dividing prisms 383R, 383G, and 383B, having polarization dividing surfaces to selectively transmit or reflect specific polarization light, are arranged instead of liquid crystal light valves 250R, 250G, and 250B and reflecting mirrors 382R, 382G, and 382B. It is necessary to change the magnifications and the arrangement of the image re-forming lenses in accordance with such a structure.

Fourth Exemplary Embodiment

According to the present exemplary embodiment described hereinafter, the same members as those of the above-mentioned exemplary embodiments are denoted by the same reference numerals and the description of the same operations is omitted. In cases where members have the same name, although they are denoted by different reference numerals, they have almost the same function. Therefore, the basic description thereof is omitted.

FIG. 9 illustrates a projector according to the fourth exemplary embodiment the present invention. A projector 401 includes a light source lamp 110, fly eye lenses 421 and 422, a superposing lens 423, collimating lenses 424R, 424G, and 424B, rotating prisms 430R, 430G, and 430B, color dividing dichroic mirrors 471 and 472, reflecting mirrors 481, 482, 483, 484, and 485, image re-forming lenses 441R, 442R, 443R, 441G, 442G, 443G, 441B, 442B, and 443B, liquid crystal light valves 250R, 250G, and 250B, color synthesizing dichroic prism 272, and a projection lens 260.

For the simplicity of description, the components of illumination light emitted from the light sources are displayed by respective divided colored light components. The respective colored light components are described as rays parallel to the main optical axis of the optical system.

First, illumination light emitted from the light source lamp 110 passes through the fly eye lenses 421 and 422 and the superposing lens 423. The aspect ratio of the image formation region of each of the liquid crystal light valves 250R, 250G, and 250B is 4:3. The aspect ratio of the appearance of each micro-lens in the fly eye lenses is 4:1.

Illumination light that has passed through the superposing lens 423 is incident on the color dividing dichroic mirror 471 and is divided into red colored light 490R, green colored light 490G, and blue colored light 490B. The color dividing dichroic mirror 471 forms an optical multi-layered film to reflect red colored light and transmitting green colored light and blue colored light, and divides incident illumination light into red colored light and green colored light, and blue colored light.

Red colored light is reflected by the reflecting mirrors 481 and 482 and is incident on the rotating prism 430R through the collimating lens 424R.

Green colored light and blue colored light are reflected by the reflecting mirror 483, are incident on the color dividing dichroic mirror 472, and are divided into green colored light and blue colored light. The color dividing dichroic mirror 472 forms an optical multi-layered film to reflect the green colored light and transmitting the blue colored light and divides incident illumination light into green colored light and blue colored light.

Green colored light is incident on the rotating prism 430G through the collimating lens 424G. Blue colored light is incident on the rotating prism 430B through the collimating lens 424B.

Therefore, the superposing lens 423 forms the image defined by the appearance of the micro-lens of the fly eye lens 421 on the inside of each of the rotating prisms 430R, 430G, and 430B.

Red colored light 490R that has passed through the rotating prism 430R is guided to the liquid crystal light valve 250R by the image re-forming lenses 441R, 442R, and 443R and the reflecting mirror 484. At this time, the image re-forming lenses 441R, 442R, and 443R form the image formed by the fly eye lenses 421 and 422, the superposing lens 423, and the collimating lens 424R that are the image forming device on the liquid crystal light valve 250R that is the display element.

Green colored light 490G that has passed through the rotating prism 430G is guided to the liquid crystal light valve 250G by the image re-forming lenses 441G, 442G, and 443G and the reflecting mirror 481. At this time, the image re-forming lenses 441G, 442G, and 443G form the image formed by the fly eye lenses 421 and 422, the superposing lens 423, and the collimating lens 424G that are the image forming device on the liquid crystal light valve 250G that is the display element.

Blue colored light 490B that has passed through the rotating prism 430B is guided to the liquid crystal light valve 250B by the image re-forming lenses 441B, 442B, and 443B and the reflecting mirror 485. At this time, the image re-forming lenses 441B, 442B, and 443B form the image formed by the fly eye lenses 421 and 422, the superposing lens 423, and the collimating lens 424B that are the image forming device on the liquid crystal light valve 250B that is the display element.

Therefore, it is possible to irradiate illumination light having a uniform illumination distribution onto the portion corresponding to ⅓ of the image formation region of each of the liquid crystal light valves 250R, 250G, and 250B. Since the rotating prisms 430R, 430G, and 430B are arranged as illumination light scanning device, the illumination light divided into respective colored light components passes through the rotating prism while the optical axis thereof is shifted in accordance with the relationship between the rotation of the rotating prism and the refractive index. Therefore, the respective divided colored light components are uniformly irradiated onto all of the image formation regions while scanning all of the image formation regions of the corresponding liquid crystal light valves 250R, 250G, and 250B. As a result, it is possible to irradiate illumination light having a uniform illumination distribution onto the image formation regions by integrating the illumination region for a certain period of time as illumination light is repeatedly scanned to the image formation regions of the liquid crystal light valves 250R, 250G, and 250B at high speed. When attention is paid to some of the image formation regions, the illumination light sometimes reaches the parts and sometimes does not reach the parts. Therefore, the phenomenon known as "intermittent turning-on" occurs.

Moreover, the distances from the light sources to the rotating prisms 430R, 430G, and 430B corresponding to the respective colored light components are almost the same for each colored light component. The optical distances from the light sources to the image formed by the fly eye lenses 421 and 422 and the superposing lens 423 are almost the same for each colored light component. As a result, it is possible to simplify the optical system and thereby to correctly focus light.

Referring back to FIG. 9, the respective colored illumination light components incident on the image formation regions of the liquid crystal light valves 250R, 250G, and 250B are modulated in the image formation regions of the liquid crystal light valves 250R, 250G, and 250B based on electric signals and are guided to the projection lens by the color synthesizing dichroic prism 282.

Illumination light incident on the projection lens 260 is projected to a screen (not shown) and displays an image on the screen. At this time, since the images of the liquid crystal light valves 250R, 250G, and 250B to modulate red colored light, green colored light, and blue colored light overlap on the screen, it is possible to display images in full color. In the images projected to the screen, the rotation positions, the rotation speed, and the rotation directions of the rotating prisms 430R, 430G, and 430B are controlled so that the projected positions of the images corresponding to the respective colored light components, which are formed by a group of image re-forming lenses, are the same. That is, when the image formed by the image re-forming lens is formed in the center of the image formation region of the liquid crystal light valve 250R at any moment, an image formed by the image re-forming lenses is also formed in the center of the image formation region of the liquid crystal light valve 250G or the liquid crystal light valve 250B. The scanning directions or speed of the images corresponding to the respective colored light components are the same.

As mentioned above, according to the fourth exemplary embodiment, the projector 401 includes a light source to emit illumination light, liquid crystal light valves 250R, 250G, and 250B having a plurality of pixels to modulate the illumination light, an irradiation optical system to irradiate illumination light emitted from the light source onto some pixels of the liquid crystal light valves 250R, 250G, and 250B, and rotating prisms 430R, 430G, and 430B to scan the illumination light irradiated by the irradiation optical system. The irradiation optical system includes fly eye lenses 421 and 422, a superposing lens 423, and collimating lenses 424R, 424G, and 424B as the image forming device to condense illumination light emitted from the light source, thereby forming an image, and image re-forming lenses 441R, 442R, 443R, 441G, 442G, 443G, 441B, 442B, and 443B as the image re-forming device to form the image formed by the image forming device on the display elements. As a result, it is possible to realize a projector capable of enhancing the quality of dynamic images, reducing limitations on the light sources, enhancing the utilization efficiency of light, and displaying images in full color similar to second embodiment.

Furthermore, in the images projected to the screen, since the positions of the images corresponding to the respective colored light components are almost the same, it is possible to obtain an optimal image capable of reducing the slowness of dynamic images and of reducing or preventing the flickering of colors in which colors are divided.

Since the rotating prisms 430R, 430G, and 430B are arranged in the respective colored light components, it is possible to optimize the position and the material of the illumination light scanning device and the coating of the surface in each colored light component with consideration to the deviation of the image forming states dependent on the difference in the wavelengths of the respective colored light components. Therefore, it is possible to correctly irradiate illumination light onto some pixels of the respective liquid crystal light valves and thereby reduce the slowness of dynamic images.

Since the distances from the light sources to the liquid crystal light valves 250R, 250G, and 250b corresponding to the respective colored light components, the distances from the light sources to the positions of the images of the respective colored light components, which are formed by the image forming device, and the distances from the positions of the images of the respective colored light components, which are formed by the image forming device, to the liquid crystal light valve 250R, 250G, and 250B are almost the same for each colored light component, it is possible to irradiate illumination light divided into respective colored light components onto some pixels of the respective liquid crystal light valves with illumination regions of the same size and to easily design the image re-forming device. Therefore, it is possible to correctly irradiate illumination light onto some pixels of the respective liquid crystal light valves and thereby reduce the slowness of dynamic images and the utilization efficiency of light. Since almost the same optical parts are arranged in each colored light component, it is possible to make the shapes of the illumination regions of the respective colored light components almost the same and to make the scanning directions of the illumination light the same. Therefore, since optical parts to make the scanning directions the same are not necessary, it is possible to simplify the optical system.

Fifth Exemplary Embodiment

According to the present exemplary embodiment described hereinafter, the same members as those of the above-mentioned exemplary embodiments are denoted by the same reference numerals and the description of the same operations is omitted. In cases where members have the same name, although they are denoted by different reference numerals, they have almost the same function. Therefore, the basic description thereof is omitted.

FIG. 10 illustrates a projector according to the fifth exemplary embodiment of the present invention. A projector 501 includes a light source lamp 110, fly eye lenses 521 and 522, superposing lens 523, collimating lenses 524R and 524, rotating prisms 530R and 530, color dividing dichroic mirrors 471 and 472, reflecting mirrors 481, 482, 483, 484, and 485, image re-forming lenses 541R, 542R, 543R, 541, 542G, 543G, 542B, and 543B, liquid crystal light valves 250R, 250G, and 250B, a color synthesizing dichroic prism 272, and a projection lens 260.

For the simplicity of description, the components of illumination light emitted from the light sources are displayed by respective divided colored light components. The respective colored light components are described as rays parallel to the main optical axis of the optical system.

First, illumination light emitted from the light source lamp 110 passes through the fly eye lenses 521 and 522 and the superposing lens 523. The aspect ratio of the image formation region of each of the liquid crystal light valves 250R, 250G, and 250B is 4:3. The aspect ratio of the appearance of each micro-lens in the fly eye lenses is 4:1.

Illumination light that has passed through the superposing lens 523 is incident on the color dividing dichroic mirror 471 and is divided into red colored light 590R, green colored light 590G, and blue colored light 590B. The color dividing dichroic mirror 471 forms an optical multi-layered film to reflect red colored light and transmitting green colored light and blue colored light and divides incident illumination light into red colored light and green colored light, and blue colored light.

Red colored light is reflected by the reflecting mirror 481 and is incident on the rotating prism 530 through the collimating lens 524R.

Green colored light and blue colored light are reflected by the reflecting mirror 483 and are incident on the rotating prism 530 through the collimating lens 524.

Therefore, the superposing lens 523 forms the image defined by the appearance of the micro-lens of the fly eye lens 521 on the inside of each of the rotating prisms 530R and 530.

Red colored light 590R that has passed through the rotating prism 530R is guided to the liquid crystal light valve 250R by the image re-forming lenses 541R, 542R, and 543R and the reflecting mirrors 482 and 484. At this time, the image re-forming lenses 541R, 542R, and 543R form the image formed by the fly eye lenses 521 and 522, the superposing lens 523, and the collimating lens 524R that are the image forming device on the liquid crystal light valve 250R that is the display element.

Further, green colored light and blue colored light that have passed through the rotating prism 530 are incident on the color dividing dichroic mirror 472 after passing through the image re-forming lens 541 and are divided into green colored light 590G and blue colored light 590B.

Green colored light 590G is guided to the liquid crystal light valve 250G by the reflecting mirror 481 and the image re-forming lenses 542G and 543G. At this time, the image re-forming lenses 541, 542G, and 543G form the image formed by the fly eye lenses 521 and 522, the superposing lens 523, and the collimating lens 524 that are the image forming device on the liquid crystal light valve 250G that is the display element.

Blue colored light 590B is guided to the liquid crystal light valve 250B by the reflecting mirror 485 and the image re-forming lenses 542B and 543B. At this time, the image re-forming lenses 541, 542B, and 543B form the image formed by the fly eye lenses 521 and 522, the superposing lens 523, and the collimating lens 524 that are the image forming device on the liquid crystal light valve 250B that is the display element.

Therefore, it is possible to irradiate illumination light having a uniform illumination distribution onto the portion corresponding to ⅓ of the image formation region of each of the liquid crystal light valves 250R, 250G, and 250B. Since the rotating prisms 530R and 530 are arranged as an illumination light scanning device, illumination light passes through the rotating prism while the optical axis thereof is shifted in accordance with the relationship between the rotation of the rotating prisms and the refractive index. Therefore, the respective divided colored light components are uniformly irradiated onto all of the image formation regions while scanning all of the image formation regions of the corresponding liquid crystal light valves 250R, 250G, and 250B. As a result, it is possible to irradiate illumination light having a uniform illumination distribution onto the image formation regions by integrating the illumination region for a certain period of time as illumination light is repeatedly scanned to the image formation regions of the liquid crystal light valves 250R, 250G, and 250B at high speed. When attention is paid to some of the image formation regions, the illumination light sometimes reaches the parts and sometimes does not reach the parts. Therefore, the phenomenon known as the "intermittent turning-on" occurs.

Moreover, the distances from the light sources to the rotating prisms 530R and 530 corresponding to the respective colored light components are almost the same for each colored light component. The optical distances from the light sources to the image formed by the fly eye lenses 521 and 522 and the superposing lens 523 are almost the same for each colored light component. As a result, it is possible to simplify the optical system and thereby to correctly focus light.

Referring back to FIG. 10, the respective colored illumination light components incident on the image formation regions of the liquid crystal light valves 250R, 250G, and 250B are modulated in the image formation regions of the liquid crystal light valves 250R, 250G, and 250B based on electric signals and are guided to the projection lens by the color synthesizing dichroic prism 282.

Illumination light incident on the projection lens 260 is projected to a screen (not shown) and displays an image on the screen. At this time, since the images of the liquid crystal light valves 250R, 250G, and 250B to modulate red colored light, green colored light, and blue colored light overlap on the screen, it is possible to display images in full color. In the images projected to the screen, the rotation positions, the rotation speed, and the rotation directions of the rotating prisms 530R and 530 are controlled so that the projected positions of the images corresponding to the respective colored light components, which are formed by a group of image reforming lenses are the same. That is, when the image formed by the image re-forming lens is formed in the center of the image formation region of the liquid crystal light valve 250R at any moment, an image formed by the image re-forming lenses is also formed in the center of the image formation region of the liquid crystal light valve 250G or the liquid crystal light valve 250B. The scanning directions or speed of the images corresponding to the respective colored light components are the same.

As mentioned above, according to the fifth exemplary embodiment, the projector 501 includes a light source to emit illumination light, liquid crystal light valves 250R, 250G, and 250B having a plurality of pixels to modulate the illumination light, an irradiation optical system to irradiate illumination light emitted from the light source onto some pixels of the liquid crystal light valves 250R, 250G, and 250B, and rotating prisms 530R and 530 to scan the illumination light irradiated by the irradiation optical system. The irradiation optical system includes fly eye lenses 521 and 522, a superposing lens 523, and collimating lenses 524R and 524 as the image forming device to condense illumination light emitted from the light source, thereby forming an image, and image re-forming lenses 541R, 542R, 543R, 541, 542G, 543G, 542B, and 543B as the image re-forming device to form the image formed by the image forming device on the liquid crystal light valves. As a result, it is possible to realize a projector capable of enhancing the quality of dynamic images, of reducing limitations on the light sources, of enhancing the utilization efficiency of light, and of displaying images in full color as described in the second exemplary embodiment.

Furthermore, in the images projected to the screen, since the positions of the images corresponding to the respective colored light components are almost the same, it is possible to obtain an optimal image capable of reducing the slowness of dynamic images and of reducing or preventing the flickering of colors in which colors are divided.

Since the rotating prisms 530R and 530 are arranged in the respective colored light components divided by the color dividing dichroic mirror 471, it is possible to optimize the position and the material of the illumination light scanning device and the coating of the surface in each colored light component with consideration to the deviation of the image forming states dependent on the difference in the wavelengths of the respective colored light components. Furthermore, since one or more illumination light components divided into respective colored light components are divided into two or more colored light components after passing through the rotating prism 530, only one prism is necessary for the green colored light and the blue colored light that are divided after passing through the rotating prism 530. Therefore, it is possible to design the optical system such that the number of rotating prisms is as small as possible with consideration to the deviation of the image forming state dependent on the difference in the wavelengths of the respective colored light components, by arranging the rotating prisms 530R and 530 in each colored light component. That is, since it is possible to separately provide the rotating prism 530R or the image re-forming lenses 541R, 542R, and 543R to the red colored light component from other colored light components in this case, it is possible to first optimize the red colored light. It is possible to make the number of parts of the rotating prisms or the image re-forming device as small as possible by sharing some parts of the optical paths of the green colored light and the blue colored light.

Since the distances from the light sources to the liquid crystal light valves 250R, 250G, and 250B correspond to the respective colored light components, the distances from the light sources to the positions of the images of the respective colored light components, which are formed by the image forming device, and the distances from the positions of the images of the respective colored light components, which are formed by the image forming device, to the liquid crystal light valve 250R, 250G, and 250B, are almost the same for each colored light component, it is possible to irradiate illumination light divided into respective colored light components onto some pixels of the respective liquid crystal light valves with illumination regions of the same size and to easily design the image re-forming device. Therefore, it is possible to correctly irradiate illumination light onto some pixels of the respective liquid crystal light valves and thereby reduce the slowness of dynamic images and the utilization efficiency of light. Since almost the same optical parts are arranged in each colored light component, it is possible to make the shapes of the illumination regions of the respective colored light components almost the same and to make the scanning directions of the illumination light the same. Therefore, since optical parts to make the scanning directions the same are not necessary, it is possible to simplify the optical system.

Sixth Exemplary Embodiment

According to the present exemplary embodiment described hereinafter, the same members as those of the above-mentioned exemplary embodiments are denoted by the same reference numerals and the description of the same operations is omitted. In cases where members have the same name, although they are denoted by different reference numerals, they have almost the same function. Therefore, the basic description thereof is omitted.

FIG. 11 schematically illustrates a projector according to the sixth exemplary embodiment of the present invention. A projector 601 includes a light source lamp 110, fly eye lenses 621 and 622, an superposing lens 623, a collimating lens 624, a rotating prism 630, color dividing dichroic mirrors 671 and 672, reflecting mirrors 681, 682, 683, and 684, image re-forming lenses 641, 642, 642R, 643R, 643G, 643B, 644B, 645B, 646B, and 647B, liquid crystal light valves 250R, 250G, and 250B, a color synthesizing dichroic prism 272, and a projection lens 260.

For the simplicity of description, the components of illumination light emitted from the light sources are displayed by respective divided colored light components. The respective colored light components are described as rays parallel to the main optical axis of the optical system.

First, illumination light emitted from the light source lamp 110 passes through the fly eye lenses 621 and 622 and the superposing lens 623. The superposing lens 623 condenses the plurality of divided partial light components and forms the image defined by the appearance of the micro-lens of the fly eye lens 621 on the inside of the rotating prism 630 through the reflecting mirror 681 and the collimating lens 624. The aspect ratio of the image formation region of each of the liquid crystal light valves 250R, 250G, and 250B is 4:3. The aspect ratio of the appearance of each micro-lens in the fly eye lenses is 4:1.

Illumination light incident on the rotating prism 630 passes through the rotating prism 630 while the optical axis thereof is shifted in accordance with the relationship between the rotation of the rotating prism 630 and the refractive index.

Next, illumination light that has passed through the rotating prism 630 is irradiated onto the color dividing dichroic mirror 671 that is a color dividing optical system after passing through the image re-forming lens 641. In the illumination light irradiated onto the color dividing dichroic mirror 671, the red colored light 690R is reflected by the color dividing dichroic mirror 671 and is irradiated onto the portion corresponding to ⅓ of the image formation region of the liquid crystal light valve 250R through the reflecting mirror 682 and the image re-forming lenses 642R and 643R as illumination light having a uniform illumination distribution. At this time, the image re-forming lenses 641, 642R, and 643R form the image formed by the fly eye lenses 621 and 622, the superposing lens 623, and the collimating lens 624 that are the image forming device on the liquid crystal light valve 250R that is the display element.

In the illumination light irradiated onto color dividing dichroic mirror 671, green colored light 690G, and blue colored light 690B pass through the color dividing dichroic mirror 671 and are irradiated onto the color dividing dichroic mirror 672 that is the color dividing optical system.

In the illumination light irradiated onto the color dividing dichroic mirror 672, the green colored light 690G is reflected by the color dividing dichroic mirror 672, passes through the image re-forming lenses 642 and 643G, and is irradiated onto the portion corresponding to ⅓ of the image formation region of the liquid crystal light valve 250G as illumination light having a uniform illumination distribution. At this time, the image re-forming lenses 641, 642, 643G form the image formed by the fly eye lenses 621 and 622, the superposing lens 623, and the collimating lens 624 that are the image forming device on the liquid crystal light valve 250G that is the display element.

In the illumination light irradiated onto the color dividing dichroic mirror 672, the blue colored light 690B passes through the color dividing dichroic mirror 672 and is irradiated onto the portion corresponding to ⅓ of the image formation region of the liquid crystal light valve 653 through the reflecting mirrors 683 and 684 and the image re-forming lenses 642, 643B, 644B, 645B, 646B, 647B, and 648B as illumination light having a uniform illumination distribution. At this time, the image re-forming device 641, 642, and 643B form the image formed by the fly eye lenses 621 and 622, the superposing lens 623, and the collimating lens 624 that are the image forming device around the image re-forming lens 643B. The image re-forming lenses 643B, 644B, and 645B form the image formed by the image re-forming lenses 641, 642, and 643B around the image re-forming lens 645B. Furthermore, the image re-forming lenses 645B, 646B, and 647B form the image formed by the image re-forming lenses 643B, 644B, and 645B on the liquid crystal light valve 250B. That is, the image re-forming lenses 641, 642, 643B, 644B, 645B, 646B, and 647B that are the image re-forming device form the image formed by the fly eye lenses 621 and 622, the superposing lens 623, and the collimating lens 624 that are the image forming device on the liquid crystal light valve 250B that is the display element.

The respective colored illumination light components incident on the image formation regions of the liquid crystal light valves 250R, 250G, and 250B are modulated in the image formation regions of the liquid crystal light valves 250R, 250G, and 250B based on electric signals and are guided to the projection lens 260 by the color synthesizing dichroic prism 272 that is the color synthesizing optical system. Illumination light incident on the projection lens 260 that is the projecting device is projected to a screen (not shown) and displays an image on the screen as image light.

Moreover, the image re-forming lenses 643B, 644B, 645B, 646B, and 647B are not arranged on the optical paths of the red colored light 690R and the green colored light 690G. Instead the image re-forming lenses 643B, 644B, 645B, 646B and 647B are arranged on the optical path of the blue colored light 690B in order to correct the deviation in overlaps in each color, which is caused by the difference in the lengths of the optical paths. That is, it is possible to reduce or prevent the influence caused by the difference in the optical paths by arranging the image re-forming lenses 643B, 644B, 645B, 646B, and 647B as a relay lens optical system by making an image have the same size before being incident and after being emitted, thereby transmitting the image on the light path of the blue colored light, and overlapping the respective colored illumination light components of the same state in the image formation regions of the corresponding liquid crystal light valves 250R, 250G, and 250B.

Further, the image re-forming lenses 643B, 644B, 645B, 646B, and 647B are the relay lens optical system to make the directions of an image the same before being incident and after being emitted, thereby transmitting the image. Specifically, since the relay lens optical system includes two sets of systems, that is, a system including the image re-forming lenses 643B, 644B, and 645B and a system including the image re-forming lenses 645B, 646B, and 647B, it is possible to project illumination light so that the scanning directions of the image light irradiated onto a screen are the same in each color. Therefore, when one set of relay lens optical system is used, the direction of an image before being incident is inverse to the direction of an imaged after being emitted. However, since two sets of relay lens optical systems are used, it is possible to make the directions of an image the same before being incident and after being emitted. Therefore, since the scanning directions of an image are the same before being incident and after being emitted, it is possible to avoid a phenomenon in which only the blue colored light is scanned in a direction reverse to the directions of the red colored light and the green colored light in the image light irradiated onto the screen. As a result, it is possible to obtain an optimal image without the flickering of colors in which colors are divided.

According to the exemplary embodiment, the relay lens optical system include only lenses. However, the relay lens optical system may include an optical system obtained by combining the curved mirrors or an optical system obtained by combining a plurality of groups of relay lens optical systems without departing from the scope of the present invention.

As mentioned above, according to the sixth exemplary embodiment, the projector 601 includes a light source to emit illumination light, liquid crystal light valves 250R, 250G, and 250B having the plurality of pixels to modulate the illumination light, an irradiation optical system to irradiate illumination light emitted from the light source onto some pixels of the liquid crystal light valves 250R, 250G, and 250B, and a rotating prism 630 to scan the illumination light irradiated by the irradiation optical system. The irradiation optical system includes fly eye lenses 621 and 622, a superposing lens 623, and a collimating lens 624 as the image forming device to condense illumination light emitted from the light source, thereby forming an image, and image re-forming lenses 641, 642, 642R, 643R, 643G, 643B, 644B, 645B, 646B, and 647B as the image re-forming device to form the image formed by the image forming device on the liquid crystal light valve. As a result, it is possible to realize a projector capable of enhancing the quality of dynamic images, of reducing limitations on the light sources, of enhancing the utilization efficiency of light, and of displaying an image in full color as in the second exemplary embodiment.

Seventh Embodiment

According to the present exemplary embodiment described hereinafter, the same members as those of the above-mentioned exemplary embodiments are denoted by the same reference numerals and the description of the same operations is omitted. In cases where members have the same name, although they are denoted by different reference numerals, they have almost the same function. Therefore, the basic description thereof is omitted.

FIG. 12 schematically illustrates a display device according to the seventh exemplary embodiment of the present invention. The display device 700 includes a light source lamp 110 (the light source), a condensing lens 791, a rod 792, image forming lenses 725, 726, and 727 (image forming device), a rotating prism 730 (illumination light scanning device, image re-forming lenses 741, 742, and 743 (the image re-forming device, and a liquid crystal light valve 150 (the display element).

In FIG. 12, the condensing lens 791 condenses illumination light emitted from the light source 110, and is incident from the incidence end of the quadratic pillar shaped rod 792 made of glass. The rod 792 emits illumination light from an emission end while reflecting the incident illumination light from an external wall using the full reflection of an interface in the external wall. The shape of the rod 792 is not limited to the quadratic pillar shape as long as the rod 792 has the same function. A hollow rod whose internal surface is made of a reflecting film may be used as the rod 792.

The appearance of the emission end of the rod 792 is formed so that the ratio thereof is exchanged with the ratio of the appearance of the image formation region of the liquid crystal light valve 150 that is the display element seen from the main optical axis of the optical system. The appearance of the image formation region of the liquid crystal light valve 150 is a rectangle having an aspect ratio of 4:3. The appearance of the emission end of the rod 792 is a rectangle having an aspect ratio of 4:1. Since the aspect ratios can be freely modified by the optical system and the same effect can be obtained even when the aspect ratios are different from those of the present exemplary embodiments, the relationship among the aspect ratios is not limited thereto.

Illumination light emitted from the rod 792 passes through the image forming lenses 725, 726, and 727 and is irradiated onto the rotating prism 730. At this time, the image forming lenses 725, 726, and 727 form the image on the emission end of the rod 792 on the inside of the rotating prism 730.

Illumination light incident on the rotating prism 730 passes through the rotating prism 730 while the optical axis thereof is shifted in accordance with the relation of the rotation of the rotating prism 730 and the refractive index.

Illumination light that has passed through the rotating prism 730 passes through the image re-forming lenses 741, 742, and 743 and is irradiated onto the liquid crystal light valve 150. At this time, the image re-forming lenses 741, 742, and 743 that are the image re-forming device form the image formed by the condensing lens 791, the rod 792, and the image forming lenses 725, 726, and 727 that are the image forming device on the liquid crystal light valve 150 that is the display device.

As a result, it is possible to irradiate illumination light having a uniform illumination distribution onto the portion corresponding to ⅓ of the image formation region of the liquid crystal light valve 150. Since the rotating prism 730 is arranged as an illumination light scanning device to scan the illumination light to the image formation region, illumination light passes through the rotating prism 730 while the optical axis thereof is shifted in accordance with the relationship between the rotation of the rotating prism 730 and the refractive index. As a result, illumination light is irradiated while being scanned to the image formation region of the liquid crystal light valve 150, as illustrated in the first exemplary embodiment.

Moreover, the structure of the image forming lens or the image re-forming lens is not limited to a structure in which an image is formed in the ratio of 1:1. The aspect ratio of the image may be changed. Furthermore, the shape of the emission end of the rod is not limited to the aspect ratio, the shape, and the size according to the present exemplary embodiment.

As mentioned above, according to the seventh exemplary embodiment, it is possible to obtain the effect described in the first exemplary embodiment.

Moreover, the present exemplary embodiment may be appropriately modified within the scope of the present invention to have structures in which the projecting devices are combined with each other and the illumination light is divided into two or more colored light components.

Further, the rod 792 as a supplement of the present exemplary embodiment does not condense light, thereby forming an image, but only guides light. Therefore, in the modification of the present exemplary embodiment the rod 792 has the function of the image forming device of the present invention by combining the optical systems, such as the image forming lenses 725, 726, and 727.

Eighth Exemplary Embodiment

According to the present exemplary embodiment described hereinafter, the same members as those of the above-mentioned exemplary embodiments are denoted by the same reference numerals and the description of the same operations is omitted. In cases where members have the same name, although they are denoted by different reference numerals, they have almost the same function. Therefore, the basic description thereof is omitted.

FIG. 13 illustrates a display device according to the eighth exemplary embodiment of the present invention. A display device 800 includes a light source lamp 110 (the light source), fly eye lenses 121 and 122, superposing lens 123, a collimating lens 124 (the image forming device), a rotating prism 130 (the illumination light scanning device), an image re-forming enlargement lens 848, a Frenel's lens 849 (the image re-forming device), a reflecting mirror 885, and a liquid crystal light valve 850 (the display element).

First, illumination light emitted from the light source lamp 110 passes through the fly eye lenses 121 and 122 and the superposing lens 123. The superposing lens 123 condenses the plurality of divided partial light components and forms the image defined by the appearance of the micro-lens of the fly eye lens 121 through the collimating lens 124 on the inside of the rotating prism 130. The aspect ratio of the image formation region of the liquid crystal light valve 850 is 4:3, whereas the aspect ratio of the appearance of each micro-lens is 4:1.

Illumination light incident on the rotating prism 130 passes through the rotating prism 130 while the optical axis thereof is shifted in accordance with the relationship between the rotation of the rotating prism 130 and the refractive index.

Illumination light that has passed through the rotating prism 130 is irradiated onto the liquid crystal light valve 850 through the image re-forming enlargement lens 848, the reflecting mirror 885, and the Frenel's lens 849. At this time, the image re-forming enlargement lens 848 and the Frenel's lens 849 that are the image re-forming device enlarge the image formed by the fly eye lenses 121 and 122, the superposing lens 123, and the collimating lens 124 that are the image forming device and form the enlarged image on the liquid crystal light valve 850 that is the display element with the image. According to the present exemplary embodiment, the Frenel's lens 849 converts the light emitted from the image re-forming enlargement lens 848 into parallel light and makes the light incident on the liquid crystal light valve 850.

Therefore, it is possible to irradiate illumination light having a uniform illumination distribution onto the portion corresponding to ⅓ of the image formation region of the liquid crystal light valve 850. Since the rotating prism 830 is arranged as the illumination light scanning device capable of scanning illumination light to the image formation region, illumination light passes through the rotating prism 830 while the optical axis thereof is shifted in accordance with the rotation of the rotating prism 830 and the refractive index. As a result, illumination light is irradiated while being scanned to the image formation region of the liquid crystal light valve 850 similarly to the operation shown in the first exemplary embodiment.

The liquid crystal light valve 850 has a structure in which polarizers are included in front of and behind the liquid crystal light valve 850 and red, green, and blue color filters are regularly arranged in each of a plurality of pixels that form the image formation region of the liquid crystal light valve 850. Therefore, when illumination light incident on the image formation region of the liquid crystal light valve 850 is modulated in each pixel based on electric signals that become the image data, an image is finally displayed on the liquid crystal light valve 850 in full color. A large-scaled liquid crystal panel rather than the liquid crystal light valve according to the previously described exemplary embodiment is used as the liquid crystal light valve 850. However, the size of the liquid crystal light valve can be appropriately modified within the scope of the present invention.

As mentioned above, according to the eighth exemplary embodiment, it is possible to obtain the effect similar to that of the first exemplary embodiment.

Moreover, various exemplary embodiment of the present invention are described. However, when the liquid crystal is used as the display element in the present invention, it is possible to enhance the utilization efficiency of light by combining the optical elements, which is disclosed in the Japanese Unexamined Patent Application Publication No. 8-304739, to make the polarization of light uniform. A rear surface projection type display device to make the image light incident from the rear surface of a screen, thereby displaying an image may be used as the projector according to an aspect of the present invention. Furthermore, the display element is not limited to a liquid crystal panel but may be, for example, a tilted mirror device, such as a DMD.

The present invention is not limited to the display device and the optical system of the projector, which are used in the respective exemplary embodiments, but may be applied to other display devices and other optical systems of the projector within the scope of the present invention. That is, the arrangement of the color divided optical elements and the arrangement of the lenses may be appropriately modified within the scope of the present invention. The rotating prism may be a regular polygonal pillar rather than a quadratic pillar.

Furthermore, according to an exemplary embodiment of the present invention, a structure in which the illumination light is color-divided is used. However, for example, a structure in which separate light sources to emit red, blue, and green colored light components and irradiation optical systems, illumination light scanning device, and display elements corresponding to the light sources to emit respective colored light components are arranged, the respective colored light components are modulated by the display elements corresponding to the respective colored light components, the respective colored light components are synthesized by a color synthesizing device, such as the color synthesizing dichroic prisms, and the respective colored light components are projected by a projecting device, such as the projection lenses as the image light, may be used. All of the display devices and the projectors may be included in the present invention if only the light source, the irradiation optical system, the illumination light scanning device, and the display element are formed so as not to depart from the scope of the present invention.

INDUSTRIAL APPLICABILITY

As described above, the display device, according to an aspect of the present invention, is useful in providing an image display device to display dynamic images, in particular, in providing a projector to project the display image of the display device.

What is claimed is:

1. A projector, comprising:
   a light source to emit illumination light;
   a color separation optical system to split the illumination light into illumination light with at least two colors;
   a plurality of display elements including a plurality of pixels to modulate the illumination light;
   a color synthesizing optical system to synthesize image light formed by the plurality of display elements;
   a projecting device to project the image light synthesized by the color synthesizing optical system;

an irradiation optical system to irradiate the illumination light emitted from the light source onto some of the pixels; and an illumination light scanning device to scan the illumination light irradiated by the irradiation optical system, each of the display elements being disposed to correspond to a single color, the irradiation optical system including an image forming device to condense the illumination light emitted by the light source to form an image and an image re-forming device to form the image formed by the image forming device on the display elements, and the illumination light irradiated onto the display elements being irradiated onto the display elements by at least the image forming device and the image re-forming device.

2. The projector according to claim 1, wherein the illumination light scanning device comprising:

a rotating prism to change a refracting angle of the illumination light by the rotation thereof, thereby scanning the illumination light, and the position of the image formed by the image forming device being positioned inside or around the rotating prism.

3. The projector according to claim 1, the illumination light being divided into two or more colored light components after passing through the illumination light scanning device, and the image re-forming device being arranged in each colored light component and forming the image formed by the image forming device on the display element corresponding to each colored light component.

4. The projector according to claim 3, the distances from the light source to the display elements corresponding to the respective colored light components being almost the same for each colored light component.

5. The projector according to claim 1, the illumination light emitted from the light source being divided into two or more colored light components, the image re-forming device and the illumination light scanning device being arranged in each colored light component, the image re-forming device forming the image formed by the image forming device on the display element corresponding to each colored light component, and the illumination light scanning device scanning the illumination light divided into respective colored light components so that the projected positions of the images formed by the image re-forming device are almost the same when the images of the display elements corresponding to the respective colored light components are projected so as to be overlapped.

6. The projector according to claim 5, the distances from the light source to the positions of the images of the respective colored light components formed by the image forming device being almost the same for each colored light component.

7. The projector according to claim 5, the distances from the positions of the images of the respective colored light components, which are formed by the image forming device, to the display elements corresponding to the respective colored light components being almost the same for each colored light component.

8. The projector according to claim 1, the illumination light emitted from the light source being divided into two or more colored light components, the image re-forming device and the illumination light scanning device being arranged in each colored light component, at least one component of the colored light being divided into two or more colored light components after passing through the illumination light scanning means, the image re-forming device forming the image formed by the image forming device on the display element corresponding to each colored light component, and the illumination light scanning device scanning the illumination light divided into respective colored light components so that the projected positions of the images formed by the image re-forming device are almost the same when the images of the display elements corresponding to the respective colored light components are projected so as to be overlapped.

* * * * *